(12) United States Patent
Wells-Rutherford et al.

(10) Patent No.: US 11,477,327 B2
(45) Date of Patent: *Oct. 18, 2022

(54) POST-MIXING ACOUSTIC ECHO CANCELLATION SYSTEMS AND METHODS

(71) Applicant: Shure Acquisition Holdings, Inc., Niles, IL (US)

(72) Inventors: Sean Wells-Rutherford, Chicago, IL (US); Mathew T. Abraham, Colorado Springs, CO (US); John Casey Gibbs, Chicago, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/523,070

(22) Filed: Jul. 26, 2019

(65) Prior Publication Data

US 2020/0228663 A1 Jul. 16, 2020

Related U.S. Application Data

(63) Continuation of application No. 15/406,172, filed on Jan. 13, 2017, now Pat. No. 10,367,948.

(51) Int. Cl.
*H04M 9/08* (2006.01)
*G10L 21/0208* (2013.01)
(Continued)

(52) U.S. Cl.
CPC ............. *H04M 9/082* (2013.01); *G10L 21/02* (2013.01); *G10L 21/0208* (2013.01);
(Continued)

(58) Field of Classification Search
CPC ...... H04M 9/082; H04M 3/568; H04M 3/002; G10L 21/02; G10L 21/0208;
(Continued)

(56) References Cited

U.S. PATENT DOCUMENTS 1,535,408 A 4/1925 Fricke
1,540,788 A 6/1925 McClure
(Continued)

FOREIGN PATENT DOCUMENTS

CA 2505496 10/2006
CA 2838856 12/2012
(Continued)

OTHER PUBLICATIONS

Advanced Network Devices, IPSCM Ceiling Tile IP Speaker, Feb. 2011, 2 pgs.
(Continued)

*Primary Examiner* — Md S Elahee
(74) *Attorney, Agent, or Firm* — Neal, Gerber & Eisenberg LLP

(57) ABSTRACT

Acoustic echo cancellation systems and methods are provided that can cancel and suppress acoustic echo from the output of a mixer that has mixed audio signals from a plurality of acoustic sources, such as microphones. The microphones may have captured speech and sound from a remote location or far end, such as in a conferencing environment. The acoustic echo cancellation may generate an echo-cancelled mixed audio signal based on a mixed audio signal from a mixer, information gathered from the audio signal from each of the plurality of acoustic sources, and a remote audio signal. The systems and methods may be computationally efficient and resource-friendly.

22 Claims, 5 Drawing Sheets

(51) Int. Cl.
*H04M 3/56* (2006.01)
*G10L 21/02* (2013.01)
*G10L 21/0232* (2013.01)
*G10L 21/0216* (2013.01)

(52) U.S. Cl.
CPC ......... *G10L 21/0232* (2013.01); *H04M 3/568* (2013.01); *G10L 2021/02082* (2013.01); *G10L 2021/02166* (2013.01)

(58) Field of Classification Search
CPC ....... G10L 21/0232; G10L 2021/02166; G10L 2021/02082
USPC ............. 379/406.01, 406.08, 413.01; 361/66
See application file for complete search history.

(56) References Cited

U.S. PATENT DOCUMENTS

| | | |
|---|---|---|
| 1,965,830 A | 7/1934 | Hammer |
| 2,075,588 A | 3/1937 | Meyers |
| 2,113,219 A | 4/1938 | Olson |
| 2,164,655 A | 7/1939 | Kleerup |
| D122,771 S | 10/1940 | Doner |
| 2,233,412 A | 3/1941 | Hill |
| 2,268,529 A | 12/1941 | Stiles |
| 2,343,037 A | 2/1944 | Adelman |
| 2,377,449 A | 6/1945 | Prevette |
| 2,481,250 A | 9/1949 | Schneider |
| 2,521,603 A | 9/1950 | Prew |
| 2,533,565 A | 12/1950 | Eichelman |
| 2,539,671 A | 1/1951 | Olson |
| 2,777,232 A | 1/1957 | Kulicke |
| 2,828,508 A | 4/1958 | Labarre |
| 2,840,181 A | 6/1958 | Wildman |
| 2,882,633 A | 4/1959 | Howell |
| 2,912,605 A | 11/1959 | Tibbetts |
| 2,938,113 A | 5/1960 | Schnell |
| 2,950,556 A | 8/1960 | Larios |
| 3,019,854 A | 2/1962 | Obryant |
| 3,132,713 A | 5/1964 | Seeler |
| 3,143,182 A | 8/1964 | Sears |
| 3,160,225 A | 12/1964 | Sechrist |
| 3,161,975 A | 12/1964 | McMillan |
| 3,205,601 A | 9/1965 | Gawne |
| 3,239,973 A | 3/1966 | Hannes |
| 3,240,883 A | 3/1966 | Seeler |
| 3,310,901 A | 3/1967 | Sarkisian |
| 3,321,170 A | 5/1967 | Vye |
| 3,509,290 A | 4/1970 | Mochida |
| 3,573,399 A | 4/1971 | Schroeder |
| 3,657,490 A | 4/1972 | Scheiber |
| 3,696,885 A | 10/1972 | Grieg |
| 3,755,625 A | 8/1973 | Maston |
| 3,828,508 A | 8/1974 | Moeller |
| 3,857,191 A | 12/1974 | Sadorus |
| 3,895,194 A | 7/1975 | Fraim |
| 3,906,431 A | 9/1975 | Clearwaters |
| D237,103 S | 10/1975 | Fisher |
| 3,936,606 A | 2/1976 | Wanke |
| 3,938,617 A | 2/1976 | Forbes |
| 3,941,638 A | 3/1976 | Horky |
| 3,992,584 A | 11/1976 | Dugan |
| 4,007,461 A | 2/1977 | Luedtke |
| 4,008,408 A | 2/1977 | Kodama |
| 4,029,170 A | 6/1977 | Phillips |
| 4,032,725 A | 6/1977 | McGee |
| 4,070,547 A | 1/1978 | Dellar |
| 4,072,821 A | 2/1978 | Bauer |
| 4,096,353 A | 6/1978 | Bauer |
| 4,127,156 A | 11/1978 | Brandt |
| 4,131,760 A | 12/1978 | Christensen |
| 4,169,219 A | 9/1979 | Beard |
| 4,184,048 A | 1/1980 | Alcaide |
| 4,198,705 A | 4/1980 | Massa |
| D255,234 S | 6/1980 | Wellward |
| D256,015 S | 7/1980 | Doherty |
| 4,212,133 A | 7/1980 | Lufkin |
| 4,237,339 A | 12/1980 | Bunting |
| 4,244,096 A | 1/1981 | Kashichi |
| 4,244,906 A | 1/1981 | Heinemann |
| 4,254,417 A | 3/1981 | Speiser |
| 4,275,694 A | 6/1981 | Nagaishi |
| 4,296,280 A | 10/1981 | Richie |
| 4,305,141 A | 12/1981 | Massa |
| 4,308,425 A | 12/1981 | Momose |
| 4,311,874 A | 1/1982 | Wallace, Jr. |
| 4,330,691 A | 5/1982 | Gordon |
| 4,334,740 A | 6/1982 | Wray |
| 4,365,449 A | 12/1982 | Liautaud |
| 4,373,191 A | 2/1983 | Fette |
| 4,393,631 A | 7/1983 | Krent |
| 4,414,433 A | 11/1983 | Horie |
| 4,429,850 A | 2/1984 | Weber |
| 4,436,966 A | 3/1984 | Botros |
| 4,449,238 A | 5/1984 | Lee |
| 4,466,117 A | 8/1984 | Goerike |
| 4,485,484 A | 11/1984 | Flanagan |
| 4,489,442 A | 12/1984 | Anderson |
| 4,518,826 A | 5/1985 | Caudill |
| 4,521,908 A | 6/1985 | Miyaji |
| 4,566,557 A | 1/1986 | Lemaitre |
| 4,593,404 A | 6/1986 | Bolin |
| 4,594,478 A | 6/1986 | Gumb |
| D285,067 S | 8/1986 | Delbuck |
| 4,625,827 A | 12/1986 | Bartlett |
| 4,653,102 A | 3/1987 | Hansen |
| 4,658,425 A | 4/1987 | Julstrom |
| 4,669,108 A | 5/1987 | Deinzer |
| 4,675,906 A | 6/1987 | Sessler |
| 4,693,174 A | 9/1987 | Anderson |
| 4,696,043 A | 9/1987 | Iwahara |
| 4,712,231 A | 12/1987 | Julstrom |
| 4,741,038 A | 4/1988 | Elko |
| 4,752,961 A | 6/1988 | Kahn |
| 4,805,730 A | 2/1989 | O'Neill |
| 4,815,132 A | 3/1989 | Minami |
| 4,860,366 A | 8/1989 | Fukushi |
| 4,862,507 A | 8/1989 | Woodard |
| 4,866,868 A | 9/1989 | Kass |
| 4,881,135 A | 11/1989 | Heilweil |
| 4,888,807 A | 12/1989 | Reichel |
| 4,903,247 A | 2/1990 | Van Gerwen |
| 4,923,032 A | 5/1990 | Nuernberger |
| 4,928,312 A | 5/1990 | Hill |
| 4,969,197 A | 11/1990 | Takaya |
| 5,000,286 A | 3/1991 | Crawford |
| 5,038,935 A | 8/1991 | Wenkman |
| 5,058,170 A | 10/1991 | Kanamori |
| 5,088,574 A | 2/1992 | Kertesz, III |
| D324,780 S | 3/1992 | Sebesta |
| 5,121,426 A | 6/1992 | Baumhauer |
| D329,239 S | 9/1992 | Hahn |
| 5,189,701 A | 2/1993 | Jain |
| 5,204,907 A | 4/1993 | Staple |
| 5,214,709 A | 5/1993 | Ribic |
| D340,718 S | 10/1993 | Leger |
| 5,289,544 A | 2/1994 | Franklin |
| D345,346 S | 3/1994 | Alfonso |
| D345,379 S | 3/1994 | Chan |
| 5,297,210 A | 3/1994 | Julstrom |
| 5,322,979 A | 6/1994 | Cassity |
| 5,323,459 A | 6/1994 | Hirano |
| 5,329,593 A | 7/1994 | Lazzeroni |
| 5,335,011 A | 8/1994 | Addeo |
| 5,353,279 A | 10/1994 | Koyama |
| 5,359,374 A | 10/1994 | Schwartz |
| 5,371,789 A | 12/1994 | Hirano |
| 5,383,293 A | 1/1995 | Royal |
| 5,384,843 A | 1/1995 | Masuda |
| 5,396,554 A | 3/1995 | Hirano |
| 5,400,413 A | 3/1995 | Kindel |
| D363,045 S | 10/1995 | Phillips |
| 5,473,701 A | 12/1995 | Cezanne |
| 5,509,634 A | 4/1996 | Gebka |

(56) References Cited

U.S. PATENT DOCUMENTS

| | | |
|---|---|---|
| 5,513,265 A | 4/1996 | Hirano |
| 5,525,765 A | 6/1996 | Freiheit |
| 5,550,924 A | 8/1996 | Helf |
| 5,550,925 A | 8/1996 | Hori |
| 5,555,447 A | 9/1996 | Kotzin |
| 5,574,793 A | 11/1996 | Hirschhorn |
| 5,602,962 A | 2/1997 | Kellermann |
| 5,633,936 A | 5/1997 | Oh |
| 5,645,257 A | 7/1997 | Ward |
| D382,118 S | 8/1997 | Ferrero |
| 5,657,393 A | 8/1997 | Crow |
| 5,661,813 A | 8/1997 | Shimauchi |
| 5,673,327 A | 9/1997 | Julstrom |
| 5,687,229 A | 11/1997 | Sih |
| 5,706,344 A | 1/1998 | Finn |
| 5,715,319 A | 2/1998 | Chu |
| 5,717,171 A | 2/1998 | Miller |
| D392,977 S | 3/1998 | Kim |
| D394,061 S | 5/1998 | Fink |
| 5,761,318 A | 6/1998 | Shimauchi |
| 5,766,702 A | 6/1998 | Lin |
| 5,787,183 A | 7/1998 | Chu |
| 5,796,819 A | 8/1998 | Romesburg |
| 5,848,146 A | 12/1998 | Slattery |
| 5,870,482 A | 2/1999 | Loeppert |
| 5,878,147 A | 3/1999 | Killion |
| 5,888,412 A | 3/1999 | Sooriakumar |
| 5,888,439 A | 3/1999 | Miller |
| D416,315 S | 11/1999 | Nanjo |
| 5,978,211 A | 11/1999 | Hong |
| 5,991,277 A | 11/1999 | Maeng |
| 6,035,962 A | 3/2000 | Lin |
| 6,039,457 A | 3/2000 | O'Neal |
| 6,041,127 A | 3/2000 | Elko |
| 6,049,607 A | 4/2000 | Marash |
| D424,538 S | 5/2000 | Hayashi |
| 6,069,961 A | 5/2000 | Nakazawa |
| 6,125,179 A | 9/2000 | Wu |
| D432,518 S | 10/2000 | Muto |
| 6,128,395 A | 10/2000 | De Vries |
| 6,137,887 A | 10/2000 | Anderson |
| 6,144,746 A | 11/2000 | Azima |
| 6,151,399 A | 11/2000 | Killion |
| 6,173,059 B1 | 1/2001 | Huang |
| 6,198,831 B1 | 3/2001 | Azima |
| 6,205,224 B1 | 3/2001 | Underbrink |
| 6,215,881 B1 | 4/2001 | Azima |
| 6,266,427 B1 | 7/2001 | Mathur |
| 6,285,770 B1 | 9/2001 | Azima |
| 6,301,357 B1 | 10/2001 | Romesburg |
| 6,329,908 B1 | 12/2001 | Frecska |
| 6,332,029 B1 | 12/2001 | Azima |
| D453,016 S | 1/2002 | Nevill |
| 6,386,315 B1 | 5/2002 | Roy |
| 6,393,129 B1 | 5/2002 | Conrad |
| 6,424,635 B1 | 7/2002 | Song |
| 6,442,272 B1 | 8/2002 | Osovets |
| 6,449,593 B1 | 9/2002 | Valve |
| 6,481,173 B1 | 11/2002 | Roy |
| 6,488,367 B1 | 12/2002 | Debesis |
| D469,090 S | 1/2003 | Tsuji |
| 6,505,057 B1 | 1/2003 | Finn |
| 6,507,659 B1 | 1/2003 | Iredale |
| 6,510,919 B1 | 1/2003 | Roy |
| 6,526,147 B1 | 2/2003 | Rung |
| 6,556,682 B1 | 4/2003 | Gilloire |
| 6,592,237 B1 | 7/2003 | Pledger |
| 6,622,030 B1 | 9/2003 | Romesburg |
| D480,923 S | 10/2003 | Neubourg |
| 6,633,647 B1 | 10/2003 | Markow |
| 6,665,971 B2 | 12/2003 | Lowry |
| 6,694,028 B1 | 2/2004 | Matsuo |
| 6,704,422 B1 | 3/2004 | Jensen |
| D489,707 S | 5/2004 | Kobayashi |
| 6,731,334 B1 | 5/2004 | Maeng |
| 6,741,720 B1 | 5/2004 | Myatt |
| 6,757,393 B1 | 6/2004 | Spitzer |
| 6,768,795 B2 | 7/2004 | Feltstroem |
| 6,868,377 B1 | 3/2005 | Laroche |
| 6,885,750 B2 | 4/2005 | Egelmeers |
| 6,885,986 B1 | 4/2005 | Gigi |
| D504,889 S | 5/2005 | Andre |
| 6,889,183 B1 | 5/2005 | Gunduzhan |
| 6,895,093 B1 | 5/2005 | Ali |
| 6,931,123 B1 | 8/2005 | Hughes |
| 6,944,312 B2 | 9/2005 | Mason |
| D510,729 S | 10/2005 | Chen |
| 6,968,064 B1 | 11/2005 | Ning |
| 6,990,193 B2 | 1/2006 | Beaucoup |
| 6,993,126 B1 | 1/2006 | Kyrylenko |
| 6,993,145 B2 | 1/2006 | Combest |
| 7,003,099 B1 | 2/2006 | Zhang |
| 7,013,267 B1 | 3/2006 | Huart |
| 7,031,269 B2 | 4/2006 | Lee |
| 7,035,398 B2 | 4/2006 | Matsuo |
| 7,035,415 B2 | 4/2006 | Belt |
| 7,050,576 B2 | 5/2006 | Zhang |
| 7,054,451 B2 | 5/2006 | Janse |
| D526,643 S | 8/2006 | Ishizaki |
| D527,372 S | 8/2006 | Allen |
| 7,092,516 B2 | 8/2006 | Furuta |
| 7,092,882 B2 | 8/2006 | Arrowood |
| 7,098,865 B2 | 8/2006 | Christensen |
| 7,106,876 B2 | 9/2006 | Santiago |
| 7,120,269 B2 | 10/2006 | Lowell |
| 7,130,309 B2 | 10/2006 | Pianka |
| D533,177 S | 12/2006 | Andre |
| 7,149,320 B2 | 12/2006 | Haykin |
| 7,161,534 B2 | 1/2007 | Tsai |
| 7,187,765 B2 | 3/2007 | Popovic |
| 7,203,308 B2 | 4/2007 | Kubota |
| D542,543 S | 5/2007 | Bruce |
| 7,212,628 B2 | 5/2007 | Popovic |
| D546,318 S | 7/2007 | Yoon |
| D546,814 S | 7/2007 | Takita |
| D547,748 S | 7/2007 | Tsuge |
| 7,239,714 B2 | 7/2007 | De Blok |
| D549,673 S | 8/2007 | Niitsu |
| 7,269,263 B2 | 9/2007 | Dedieu |
| D552,570 S | 10/2007 | Niitsu |
| D559,553 S | 1/2008 | Mischel |
| 7,333,476 B2 | 2/2008 | LeBlanc |
| D566,685 S | 4/2008 | Koller |
| 7,359,504 B1 | 4/2008 | Reuss |
| 7,366,310 B2 | 4/2008 | Stinson |
| 7,387,151 B1 | 6/2008 | Payne |
| 7,412,376 B2 | 8/2008 | Florencio |
| 7,415,117 B2 | 8/2008 | Tashev |
| D578,509 S | 10/2008 | Thomas |
| D581,510 S | 11/2008 | Albano |
| D582,391 S | 12/2008 | Morimoto |
| D587,709 S | 3/2009 | Niitsu |
| D589,605 S | 3/2009 | Reedy |
| 7,503,616 B2 | 3/2009 | Linhard |
| 7,515,719 B2 | 4/2009 | Hooley |
| 7,536,769 B2 | 5/2009 | Pedersen |
| D595,402 S | 6/2009 | Miyake |
| D595,736 S | 7/2009 | Son |
| 7,558,381 B1 | 7/2009 | Ali |
| 7,565,949 B2 | 7/2009 | Tojo |
| D601,585 S | 10/2009 | Andre |
| 7,651,390 B1 | 1/2010 | Profeta |
| 7,660,428 B2 | 2/2010 | Rodman |
| 7,667,728 B2 | 2/2010 | Kenoyer |
| 7,672,445 B1 | 3/2010 | Zhang |
| D613,338 S | 4/2010 | Marukos |
| 7,701,110 B2 | 4/2010 | Fukuda |
| 7,702,116 B2 | 4/2010 | Stone |
| D614,871 S | 5/2010 | Tang |
| 7,724,891 B2 | 5/2010 | Beaucoup |
| D617,441 S | 6/2010 | Koury |
| 7,747,001 B2 | 6/2010 | Kellermann |
| 7,756,278 B2 | 7/2010 | Moorer |
| 7,783,063 B2 | 8/2010 | Pocino |

(56) References Cited

U.S. PATENT DOCUMENTS

| | | |
|---|---|---|
| 7,787,328 B2 | 8/2010 | Chu |
| 7,830,862 B2 | 11/2010 | James |
| 7,831,035 B2 | 11/2010 | Stokes |
| 7,831,036 B2 | 11/2010 | Beaucoup |
| 7,856,097 B2 | 12/2010 | Tokuda |
| 7,881,486 B1 | 2/2011 | Killion |
| 7,894,421 B2 | 2/2011 | Kwan |
| D636,188 S | 4/2011 | Kim |
| 7,925,006 B2 | 4/2011 | Hirai |
| 7,925,007 B2 | 4/2011 | Stokes |
| 7,936,886 B2 | 5/2011 | Kim |
| 7,970,123 B2 | 6/2011 | Beaucoup |
| 7,970,151 B2 | 6/2011 | Oxford |
| D642,385 S | 8/2011 | Lee |
| D643,015 S | 8/2011 | Kim |
| 7,991,167 B2 | 8/2011 | Oxford |
| 7,995,768 B2 | 8/2011 | Miki |
| 8,000,481 B2 | 8/2011 | Nishikawa |
| 8,005,238 B2 | 8/2011 | Tashev |
| 8,019,091 B2 | 9/2011 | Burnett |
| 8,041,054 B2 | 10/2011 | Yeldener |
| 8,059,843 B2 | 11/2011 | Hung |
| 8,064,629 B2 | 11/2011 | Jiang |
| 8,085,947 B2 | 12/2011 | Haulick |
| 8,085,949 B2 | 12/2011 | Kim |
| 8,095,120 B1 | 1/2012 | Blair |
| 8,098,842 B2 | 1/2012 | Florencio |
| 8,098,844 B2 | 1/2012 | Elko |
| 8,103,030 B2 | 1/2012 | Barthel |
| 8,109,360 B2 | 2/2012 | Stewart, Jr. |
| 8,112,272 B2 | 2/2012 | Nagahama |
| 8,116,500 B2 | 2/2012 | Oxford |
| 8,121,834 B2 | 2/2012 | Rosec |
| D655,271 S | 3/2012 | Park |
| D656,473 S | 3/2012 | Laube |
| 8,130,969 B2 | 3/2012 | Buck |
| 8,130,977 B2 | 3/2012 | Chu |
| 8,135,143 B2 | 3/2012 | Ishibashi |
| 8,144,886 B2 | 3/2012 | Ishibashi |
| D658,153 S | 4/2012 | Woo |
| 8,155,331 B2 | 4/2012 | Nakadai |
| 8,175,291 B2 | 5/2012 | Chan |
| 8,175,871 B2 | 5/2012 | Wang |
| 8,184,801 B1 | 5/2012 | Hamalainen |
| 8,189,765 B2 | 5/2012 | Nishikawa |
| 8,189,810 B2 | 5/2012 | Wolff |
| 8,194,863 B2 | 6/2012 | Takumai |
| 8,199,927 B1 | 6/2012 | Raftery |
| 8,204,198 B2 | 6/2012 | Adeney |
| 8,204,248 B2 | 6/2012 | Haulick |
| 8,208,664 B2 | 6/2012 | Iwasaki |
| 8,213,596 B2 | 7/2012 | Beaucoup |
| 8,213,634 B1 | 7/2012 | Daniel |
| 8,219,387 B2 | 7/2012 | Cutler |
| 8,229,134 B2 | 7/2012 | Duraiswami |
| 8,233,352 B2 | 7/2012 | Beaucoup |
| 8,243,951 B2 | 8/2012 | Ishibashi |
| 8,244,536 B2 | 8/2012 | Arun |
| 8,249,273 B2 | 8/2012 | Inoda |
| 8,259,959 B2 | 9/2012 | Marton |
| 8,275,120 B2 | 9/2012 | Stokes, III |
| 8,280,728 B2 | 10/2012 | Chen |
| 8,284,949 B2 | 10/2012 | Farhang |
| 8,284,952 B2 | 10/2012 | Reining |
| 8,286,749 B2 | 10/2012 | Stewart |
| 8,290,142 B1 | 10/2012 | Lambert |
| 8,291,670 B2 | 10/2012 | Gard |
| 8,297,402 B2 | 10/2012 | Stewart |
| 8,315,380 B2 | 11/2012 | Liu |
| 8,331,582 B2 | 12/2012 | Steele |
| 8,345,898 B2 | 1/2013 | Reining |
| 8,355,521 B2 | 1/2013 | Larson |
| 8,370,140 B2 | 2/2013 | Vitte |
| 8,379,823 B2 | 2/2013 | Ratmanski |
| 8,385,557 B2 | 2/2013 | Tashev |
| D678,329 S | 3/2013 | Lee |
| 8,395,653 B2 | 3/2013 | Feng |
| 8,403,107 B2 | 3/2013 | Stewart |
| 8,406,436 B2 | 3/2013 | Craven |
| 8,428,661 B2 | 4/2013 | Chen |
| 8,433,061 B2 | 4/2013 | Cutler |
| D682,266 S | 5/2013 | Wu |
| 8,437,490 B2 | 5/2013 | Marton |
| 8,443,930 B2 | 5/2013 | Stewart, Jr. |
| 8,447,590 B2 | 5/2013 | Ishibashi |
| 8,472,639 B2 | 6/2013 | Reining |
| 8,472,640 B2 | 6/2013 | Marton |
| D685,346 S | 7/2013 | Szymanski |
| D686,182 S | 7/2013 | Ashiwa |
| 8,479,871 B2 | 7/2013 | Stewart |
| 8,483,398 B2 | 7/2013 | Fozunbal |
| 8,498,423 B2 | 7/2013 | Thaden |
| D687,432 S | 8/2013 | Duan |
| 8,503,653 B2 | 8/2013 | Ahuja |
| 8,515,089 B2 | 8/2013 | Nicholson |
| 8,515,109 B2 | 8/2013 | Dittberner |
| 8,526,633 B2 | 9/2013 | Ukai |
| 8,553,904 B2 | 10/2013 | Said |
| 8,559,611 B2 | 10/2013 | Ratmanski |
| D693,328 S | 11/2013 | Goetzen |
| 8,583,481 B2 | 11/2013 | Walter |
| 8,599,194 B2 | 12/2013 | Lewis |
| 8,600,443 B2 | 12/2013 | Kawaguchi |
| 8,605,890 B2 | 12/2013 | Zhang |
| 8,620,650 B2 | 12/2013 | Walters |
| 8,631,897 B2 | 1/2014 | Stewart |
| 8,634,569 B2 | 1/2014 | Lu |
| 8,638,951 B2 | 1/2014 | Zurek |
| D699,712 S | 2/2014 | Bourne |
| 8,644,477 B2 | 2/2014 | Gilbert |
| 8,654,955 B1 | 2/2014 | Lambert |
| 8,654,990 B2 | 2/2014 | Faller |
| 8,660,274 B2 | 2/2014 | Wolff |
| 8,660,275 B2 | 2/2014 | Buck |
| 8,670,581 B2 | 3/2014 | Harman |
| 8,672,087 B2 | 3/2014 | Stewart |
| 8,675,890 B2 | 3/2014 | Schmidt |
| 8,675,899 B2 | 3/2014 | Jung |
| 8,676,728 B2 | 3/2014 | Velusamy |
| 8,682,675 B2 | 3/2014 | Togami |
| 8,724,829 B2 | 5/2014 | Visser |
| 8,730,156 B2 | 5/2014 | Weising |
| 8,744,069 B2 | 6/2014 | Cutler |
| 8,744,101 B1 | 6/2014 | Burns |
| 8,755,536 B2 | 6/2014 | Chen |
| 8,811,601 B2 | 8/2014 | Mohammad |
| 8,818,002 B2 | 8/2014 | Tashev |
| 8,824,693 B2 | 9/2014 | Åhgren |
| 8,842,851 B2 | 9/2014 | Beaucoup |
| 8,855,326 B2 | 10/2014 | Derkx |
| 8,855,327 B2 | 10/2014 | Tanaka |
| 8,861,713 B2 | 10/2014 | Xu |
| 8,861,756 B2 | 10/2014 | Zhu |
| 8,873,789 B2 | 10/2014 | Bigeh |
| D717,272 S | 11/2014 | Kim |
| 8,886,343 B2 | 11/2014 | Ishibashi |
| 8,893,849 B2 | 11/2014 | Hudson |
| 8,898,633 B2 | 11/2014 | Bryant |
| D718,731 S | 12/2014 | Lee |
| 8,903,106 B2 | 12/2014 | Meyer |
| 8,923,529 B2 | 12/2014 | McCowan |
| 8,929,564 B2 | 1/2015 | Kikkeri |
| 8,942,382 B2 | 1/2015 | Elko |
| 8,965,546 B2 | 2/2015 | Visser |
| D725,059 S | 3/2015 | Kim |
| D725,631 S | 3/2015 | McNamara |
| 8,976,977 B2 | 3/2015 | De |
| 8,983,089 B1 | 3/2015 | Chu |
| 8,983,834 B2 | 3/2015 | Davis |
| D726,144 S | 4/2015 | Kang |
| D727,968 S | 4/2015 | Onoue |
| 9,002,028 B2 | 4/2015 | Haulick |
| D729,767 S | 5/2015 | Lee |
| 9,038,301 B2 | 5/2015 | Zelbacher |

(56) References Cited

U.S. PATENT DOCUMENTS

| | | |
|---|---|---|
| 9,088,336 B2 | 7/2015 | Mani |
| 9,094,496 B2 | 7/2015 | Teutsch |
| D735,717 S | 8/2015 | Lam |
| D737,245 S | 8/2015 | Fan |
| 9,099,094 B2 | 8/2015 | Burnett |
| 9,107,001 B2 | 8/2015 | Diethorn |
| 9,111,543 B2 | 8/2015 | Åhgren |
| 9,113,242 B2 | 8/2015 | Hyun |
| 9,113,247 B2 | 8/2015 | Chatlani |
| 9,126,827 B2 | 9/2015 | Hsieh |
| 9,129,223 B1 | 9/2015 | Velusamy |
| 9,140,054 B2 | 9/2015 | Oberbroeckling |
| D740,279 S | 10/2015 | Wu |
| 9,172,345 B2 | 10/2015 | Kok |
| D743,376 S | 11/2015 | Kim |
| D743,939 S | 11/2015 | Seong |
| 9,196,261 B2 | 11/2015 | Burnett |
| 9,197,974 B1 | 11/2015 | Clark |
| 9,203,494 B2 | 12/2015 | Tarighat Mehrabani |
| 9,215,327 B2 | 12/2015 | Bathurst |
| 9,215,543 B2 | 12/2015 | Sun |
| 9,226,062 B2 | 12/2015 | Sun |
| 9,226,070 B2 | 12/2015 | Hyun |
| 9,226,088 B2 | 12/2015 | Pandey |
| 9,232,185 B2 | 1/2016 | Graham |
| 9,237,391 B2 | 1/2016 | Benesty |
| 9,247,367 B2 | 1/2016 | Nobile |
| 9,253,567 B2 | 2/2016 | Morcelli |
| 9,257,132 B2 | 2/2016 | Gowreesunker |
| 9,264,553 B2 | 2/2016 | Pandey |
| 9,264,805 B2 | 2/2016 | Buck |
| 9,280,985 B2 | 3/2016 | Tawada |
| 9,286,908 B2 | 3/2016 | Zhang |
| 9,294,839 B2 | 3/2016 | Lambert |
| 9,301,049 B2 | 3/2016 | Elko |
| D754,103 S | 4/2016 | Fischer |
| 9,307,326 B2 | 4/2016 | Elko |
| 9,319,532 B2 | 4/2016 | Bao |
| 9,319,799 B2 | 4/2016 | Salmon |
| 9,326,060 B2 | 4/2016 | Nicholson |
| D756,502 S | 5/2016 | Lee |
| 9,330,673 B2 | 5/2016 | Cho |
| 9,338,301 B2 | 5/2016 | Pocino |
| 9,338,549 B2 | 5/2016 | Haulick |
| 9,354,310 B2 | 5/2016 | Visser |
| 9,357,080 B2 | 5/2016 | Beaucoup |
| 9,403,670 B2 | 8/2016 | Schelling |
| 9,426,598 B2 | 8/2016 | Walsh |
| D767,748 S | 9/2016 | Nakai |
| 9,451,078 B2 | 9/2016 | Yang |
| D769,239 S | 10/2016 | Li |
| 9,462,378 B2 | 10/2016 | Kuech |
| 9,473,868 B2 | 10/2016 | Huang |
| 9,479,627 B1 | 10/2016 | Rung |
| 9,479,885 B1 | 10/2016 | Ivanov |
| 9,489,948 B1 | 11/2016 | Chu |
| 9,510,090 B2 | 11/2016 | Lissek |
| 9,514,723 B2 | 12/2016 | Silfvast |
| 9,516,412 B2 | 12/2016 | Shigenaga |
| 9,521,057 B2 | 12/2016 | Klingbeil |
| 9,549,245 B2 | 1/2017 | Frater |
| 9,560,446 B1 | 1/2017 | Chang |
| 9,560,451 B2 | 1/2017 | Eichfeld |
| 9,565,493 B2 | 2/2017 | Abraham |
| 9,578,413 B2 | 2/2017 | Sawa |
| 9,578,440 B2 | 2/2017 | Otto |
| 9,589,556 B2 | 3/2017 | Gao |
| 9,591,123 B2 | 3/2017 | Sorensen |
| 9,591,404 B1 | 3/2017 | Chhetri |
| D784,299 S | 4/2017 | Cho |
| 9,615,173 B2 | 4/2017 | Sako |
| 9,628,596 B1 | 4/2017 | Bullough |
| 9,635,186 B2 | 4/2017 | Pandey |
| 9,635,474 B2 | 4/2017 | Kuster |
| D787,481 S | 5/2017 | Tysso |
| D788,073 S | 5/2017 | Silvera |
| 9,640,187 B2 | 5/2017 | Niemisto |
| 9,641,688 B2 | 5/2017 | Pandey |
| 9,641,929 B2 | 5/2017 | Li |
| 9,641,935 B1 | 5/2017 | Ivanov |
| 9,653,091 B2 | 5/2017 | Matsuo |
| 9,653,092 B2 | 5/2017 | Sun |
| 9,655,001 B2 | 5/2017 | Metzger |
| 9,659,576 B1 | 5/2017 | Kotvis |
| D789,323 S | 6/2017 | Mackiewicz |
| 9,674,604 B2 | 6/2017 | Deroo |
| 9,692,882 B2 | 6/2017 | Mani |
| 9,706,057 B2 | 7/2017 | Mani |
| 9,716,944 B2 | 7/2017 | Yliaho |
| 9,721,582 B1 | 8/2017 | Huang |
| 9,734,835 B2 | 8/2017 | Fujieda |
| 9,754,572 B2 | 9/2017 | Salazar |
| 9,761,243 B2 | 9/2017 | Taenzer |
| D801,285 S | 10/2017 | Timmins |
| 9,788,119 B2 | 10/2017 | Vilermo |
| 9,813,806 B2 | 11/2017 | Graham |
| 9,818,426 B2 | 11/2017 | Kotera |
| 9,826,211 B2 | 11/2017 | Sawa |
| 9,854,101 B2 | 12/2017 | Pandey |
| 9,854,363 B2 | 12/2017 | Sladeczek |
| 9,860,439 B2 | 1/2018 | Sawa |
| 9,866,952 B2 | 1/2018 | Pandey |
| D811,393 S | 2/2018 | Ahn |
| 9,894,434 B2 | 2/2018 | Rollow, IV |
| 9,930,448 B1 | 3/2018 | Chen |
| 9,936,290 B2 | 4/2018 | Mohammad |
| 9,966,059 B1 | 5/2018 | Ayrapetian |
| 9,973,848 B2 | 5/2018 | Chhetri |
| 9,980,042 B1 | 5/2018 | Benattar |
| D819,607 S | 6/2018 | Chui |
| D819,631 S | 6/2018 | Matsumiya |
| 10,015,589 B1 | 7/2018 | Ebenezer |
| 10,021,506 B2 | 7/2018 | Johnson |
| 10,021,515 B1 | 7/2018 | Mallya |
| 10,034,116 B2 | 7/2018 | Kadri |
| 10,054,320 B2 | 8/2018 | Choi |
| 10,153,744 B1 | 12/2018 | Every |
| 10,165,386 B2 | 12/2018 | Lehtiniemi |
| D841,589 S | 2/2019 | Böhmer |
| 10,206,030 B2 | 2/2019 | Matsumoto |
| 10,210,882 B1 | 2/2019 | McCowan |
| 10,231,062 B2 | 3/2019 | Pedersen |
| 10,244,121 B2 | 3/2019 | Mani |
| 10,244,219 B2 | 3/2019 | Sawa |
| 10,269,343 B2 | 4/2019 | Wingate |
| 10,367,948 B2 | 7/2019 | Wells-Rutherford |
| D857,873 S | 8/2019 | Shimada |
| 10,389,861 B2 | 8/2019 | Mani |
| 10,389,885 B2 | 8/2019 | Sun |
| D860,319 S | 9/2019 | Beruto |
| D860,997 S | 9/2019 | Jhun |
| D864,136 S | 10/2019 | Kim |
| 10,440,469 B2 | 10/2019 | Barnett |
| D865,723 S | 11/2019 | Cho |
| 10,566,008 B2 | 2/2020 | Thorpe |
| 10,602,267 B2 | 3/2020 | Grosche |
| D883,952 S | 5/2020 | Lucas |
| 10,650,797 B2 | 5/2020 | Kumar |
| D888,020 S | 6/2020 | Lyu |
| 10,728,653 B2 | 7/2020 | Graham |
| D900,070 S | 10/2020 | Lantz |
| D900,071 S | 10/2020 | Lantz |
| D900,072 S | 10/2020 | Lantz |
| D900,073 S | 10/2020 | Lantz |
| D900,074 S | 10/2020 | Lantz |
| 10,827,263 B2 | 11/2020 | Christoph |
| 10,863,270 B1 | 12/2020 | O'Neill |
| 10,930,297 B2 | 2/2021 | Christoph |
| 10,959,018 B1 | 3/2021 | Shi |
| 10,979,805 B2 | 4/2021 | Chowdhary |
| D924,189 S | 7/2021 | Park |
| 11,109,133 B2 | 8/2021 | Lantz |
| D940,116 S | 1/2022 | Cho |
| 2001/0031058 A1 | 10/2001 | Anderson |

(56) References Cited

U.S. PATENT DOCUMENTS

| | | |
|---|---|---|
| 2002/0015500 A1 | 2/2002 | Belt |
| 2002/0041679 A1 | 4/2002 | Beaucoup |
| 2002/0048377 A1 | 4/2002 | Vaudrey |
| 2002/0064158 A1 | 5/2002 | Yokoyama |
| 2002/0064287 A1 | 5/2002 | Kawamura |
| 2002/0069054 A1 | 6/2002 | Arrowood |
| 2002/0110255 A1 | 8/2002 | Killion |
| 2002/0126861 A1 | 9/2002 | Colby |
| 2002/0131580 A1 | 9/2002 | Smith |
| 2002/0140633 A1 | 10/2002 | Rafii |
| 2002/0146282 A1 | 10/2002 | Wilkes |
| 2002/0149070 A1 | 10/2002 | Sheplak |
| 2002/0159603 A1 | 10/2002 | Hirai |
| 2003/0026437 A1 | 2/2003 | Janse |
| 2003/0053639 A1 | 3/2003 | Beaucoup |
| 2003/0059061 A1 | 3/2003 | Tsuji |
| 2003/0063762 A1 | 4/2003 | Tajima |
| 2003/0063768 A1 | 4/2003 | Cornelius |
| 2003/0072461 A1 | 4/2003 | Moorer |
| 2003/0107478 A1 | 6/2003 | Hendricks |
| 2003/0118200 A1 | 6/2003 | Beaucoup |
| 2003/0122777 A1 | 7/2003 | Grover |
| 2003/0138119 A1 | 7/2003 | Pocino |
| 2003/0156725 A1 | 8/2003 | Boone |
| 2003/0161485 A1 | 8/2003 | Smith |
| 2003/0163326 A1 | 8/2003 | Maase |
| 2003/0169888 A1 | 9/2003 | Subotic |
| 2003/0185404 A1 | 10/2003 | Milsap |
| 2003/0198339 A1 | 10/2003 | Roy |
| 2003/0198359 A1 | 10/2003 | Killion |
| 2003/0202107 A1 | 10/2003 | Slattery |
| 2004/0013038 A1 | 1/2004 | Kajala |
| 2004/0013252 A1 | 1/2004 | Craner |
| 2004/0076305 A1 | 4/2004 | Santiago |
| 2004/0105557 A1 | 6/2004 | Matsuo |
| 2004/0125942 A1 | 7/2004 | Beaucoup |
| 2004/0175006 A1 | 9/2004 | Kim |
| 2004/0202345 A1 | 10/2004 | Stenberg |
| 2004/0240664 A1 | 12/2004 | Freed |
| 2005/0005494 A1 | 1/2005 | Way |
| 2005/0041530 A1 | 2/2005 | Goudie |
| 2005/0069156 A1 | 3/2005 | Haapapuro |
| 2005/0094580 A1 | 5/2005 | Kumar |
| 2005/0094795 A1 | 5/2005 | Rambo |
| 2005/0149320 A1 | 7/2005 | Kajala |
| 2005/0157897 A1 | 7/2005 | Saltykov |
| 2005/0175189 A1 | 8/2005 | Lee |
| 2005/0175190 A1 | 8/2005 | Tashev |
| 2005/0213747 A1 | 9/2005 | Popovich |
| 2005/0221867 A1 | 10/2005 | Zurek |
| 2005/0238196 A1 | 10/2005 | Furuno |
| 2005/0270906 A1 | 12/2005 | Ramenzoni |
| 2005/0271221 A1 | 12/2005 | Cerwin |
| 2005/0286698 A1 | 12/2005 | Bathurst |
| 2005/0286729 A1 | 12/2005 | Harwood |
| 2006/0083390 A1 | 4/2006 | Kaderavek |
| 2006/0088173 A1 | 4/2006 | Rodman |
| 2006/0093128 A1 | 5/2006 | Oxford |
| 2006/0098403 A1 | 5/2006 | Smith |
| 2006/0104458 A1 | 5/2006 | Kenoyer |
| 2006/0109983 A1 | 5/2006 | Young |
| 2006/0151256 A1 | 7/2006 | Lee |
| 2006/0159293 A1 | 7/2006 | Azima |
| 2006/0161430 A1 | 7/2006 | Schweng |
| 2006/0165242 A1 | 7/2006 | Miki |
| 2006/0192976 A1 | 8/2006 | Hall |
| 2006/0198541 A1 | 9/2006 | Henry |
| 2006/0204022 A1 | 9/2006 | Hooley |
| 2006/0215866 A1 | 9/2006 | Francisco |
| 2006/0222187 A1 | 10/2006 | Jarrett |
| 2006/0233353 A1 | 10/2006 | Beaucoup |
| 2006/0239471 A1 | 10/2006 | Mao |
| 2006/0262942 A1 | 11/2006 | Oxford |
| 2006/0269080 A1 | 11/2006 | Oxford |
| 2006/0269086 A1 | 11/2006 | Page |
| 2007/0006474 A1 | 1/2007 | Taniguchi |
| 2007/0009116 A1 | 1/2007 | Reining |
| 2007/0019828 A1 | 1/2007 | Hughes |
| 2007/0053524 A1 | 3/2007 | Haulick |
| 2007/0093714 A1 | 4/2007 | Beaucoup |
| 2007/0116255 A1 | 5/2007 | Derkx |
| 2007/0120029 A1 | 5/2007 | Keung |
| 2007/0165871 A1 | 7/2007 | Roovers |
| 2007/0230712 A1 | 10/2007 | Belt |
| 2007/0253561 A1 | 11/2007 | Williams |
| 2007/0269066 A1 | 11/2007 | Derleth |
| 2008/0008339 A1 | 1/2008 | Ryan |
| 2008/0033723 A1 | 2/2008 | Jang |
| 2008/0046235 A1 | 2/2008 | Chen |
| 2008/0056517 A1 | 3/2008 | Algazi |
| 2008/0101622 A1 | 5/2008 | Sugiyama |
| 2008/0130907 A1 | 6/2008 | Sudo |
| 2008/0144848 A1 | 6/2008 | Buck |
| 2008/0168283 A1 | 7/2008 | Penning |
| 2008/0188965 A1 | 8/2008 | Bruey |
| 2008/0212805 A1 | 9/2008 | Fincham |
| 2008/0232607 A1 | 9/2008 | Tashev |
| 2008/0247567 A1 | 10/2008 | Kjolerbakken |
| 2008/0253553 A1 | 10/2008 | Li |
| 2008/0253589 A1 | 10/2008 | Trahms |
| 2008/0259731 A1 | 10/2008 | Happonen |
| 2008/0260175 A1 | 10/2008 | Elko |
| 2008/0279400 A1 | 11/2008 | Knoll |
| 2008/0285772 A1 | 11/2008 | Haulick |
| 2009/0003586 A1 | 1/2009 | Lai |
| 2009/0030536 A1 | 1/2009 | Gur |
| 2009/0052684 A1 | 2/2009 | Ishibashi |
| 2009/0086998 A1 | 4/2009 | Jeong |
| 2009/0087000 A1 | 4/2009 | Ko |
| 2009/0087001 A1 | 4/2009 | Jiang |
| 2009/0094817 A1 | 4/2009 | Killion |
| 2009/0129609 A1 | 5/2009 | Oh |
| 2009/0147967 A1 | 6/2009 | Ishibashi |
| 2009/0150149 A1 | 6/2009 | Cutter |
| 2009/0161880 A1 | 6/2009 | Hooley |
| 2009/0169027 A1 | 7/2009 | Ura |
| 2009/0173030 A1 | 7/2009 | Gulbrandsen |
| 2009/0173570 A1 | 7/2009 | Levit |
| 2009/0226004 A1 | 9/2009 | Soerensen |
| 2009/0233545 A1 | 9/2009 | Sutskover |
| 2009/0237561 A1 | 9/2009 | Kobayashi |
| 2009/0254340 A1 | 10/2009 | Sun |
| 2009/0274318 A1 | 11/2009 | Ishibashi |
| 2009/0310794 A1 | 12/2009 | Ishibashi |
| 2010/0011644 A1 | 1/2010 | Kramer |
| 2010/0034397 A1 | 2/2010 | Nakadai |
| 2010/0074433 A1 | 3/2010 | Zhang |
| 2010/0111323 A1 | 5/2010 | Marton |
| 2010/0111324 A1 | 5/2010 | Yeldener |
| 2010/0119097 A1 | 5/2010 | Ohtsuka |
| 2010/0123785 A1 | 5/2010 | Chen |
| 2010/0128892 A1 | 5/2010 | Chen |
| 2010/0128901 A1 | 5/2010 | Herman |
| 2010/0131749 A1 | 5/2010 | Kim |
| 2010/0142721 A1 | 6/2010 | Wada |
| 2010/0150364 A1 | 6/2010 | Buck |
| 2010/0158268 A1 | 6/2010 | Marton |
| 2010/0165071 A1 | 7/2010 | Ishibashi |
| 2010/0166219 A1 | 7/2010 | Marton |
| 2010/0189275 A1 | 7/2010 | Christoph |
| 2010/0189299 A1 | 7/2010 | Grant |
| 2010/0202628 A1 | 8/2010 | Meyer |
| 2010/0208605 A1 | 8/2010 | Wang |
| 2010/0215184 A1 | 8/2010 | Buck |
| 2010/0215189 A1 | 8/2010 | Marton |
| 2010/0217590 A1 | 8/2010 | Nemer |
| 2010/0245624 A1 | 9/2010 | Beaucoup |
| 2010/0246873 A1 | 9/2010 | Chen |
| 2010/0284185 A1 | 11/2010 | Ngai |
| 2010/0305728 A1 | 12/2010 | Aiso |
| 2010/0314513 A1 | 12/2010 | Evans |
| 2011/0002469 A1 | 1/2011 | Ojala |
| 2011/0007921 A1 | 1/2011 | Stewart |
| 2011/0033063 A1 | 2/2011 | McGrath |

(56) References Cited

U.S. PATENT DOCUMENTS

| | | |
|---|---|---|
| 2011/0038229 A1 | 2/2011 | Beaucoup |
| 2011/0096136 A1 | 4/2011 | Liu |
| 2011/0096631 A1 | 4/2011 | Kondo |
| 2011/0096915 A1 | 4/2011 | Nemer |
| 2011/0164761 A1 | 7/2011 | McCowan |
| 2011/0194719 A1 | 8/2011 | Frater |
| 2011/0211706 A1 | 9/2011 | Tanaka |
| 2011/0235821 A1 | 9/2011 | Okita |
| 2011/0268287 A1 | 11/2011 | Ishibashi |
| 2011/0311064 A1 | 12/2011 | Teutsch |
| 2011/0311085 A1 | 12/2011 | Stewart |
| 2011/0317862 A1 | 12/2011 | Hosoe |
| 2012/0002835 A1 | 1/2012 | Stewart |
| 2012/0014049 A1 | 1/2012 | Ogle |
| 2012/0027227 A1 | 2/2012 | Kok |
| 2012/0076316 A1 | 3/2012 | Zhu |
| 2012/0080260 A1 | 4/2012 | Stewart |
| 2012/0093344 A1 | 4/2012 | Sun |
| 2012/0117474 A1 | 5/2012 | Miki |
| 2012/0128160 A1 | 5/2012 | Kim |
| 2012/0128175 A1 | 5/2012 | Visser |
| 2012/0155688 A1 | 6/2012 | Wilson |
| 2012/0155703 A1 | 6/2012 | Hernandez-Abrego |
| 2012/0163625 A1 | 6/2012 | Siotis |
| 2012/0169826 A1 | 7/2012 | Jeong |
| 2012/0177219 A1 | 7/2012 | Mullen |
| 2012/0182429 A1 | 7/2012 | Forutanpour |
| 2012/0207335 A1 | 8/2012 | Spaanderman |
| 2012/0224709 A1 | 9/2012 | Keddem |
| 2012/0243698 A1 | 9/2012 | Elko |
| 2012/0262536 A1 | 10/2012 | Chen |
| 2012/0288079 A1 | 11/2012 | Burnett |
| 2012/0288114 A1 | 11/2012 | Duraiswami |
| 2012/0294472 A1 | 11/2012 | Hudson |
| 2012/0327115 A1 | 12/2012 | Chhetri |
| 2012/0328142 A1 | 12/2012 | Horibe |
| 2013/0002797 A1* | 1/2013 | Thapa .................. H04M 3/002 348/14.01 |
| 2013/0004013 A1 | 1/2013 | Stewart |
| 2013/0015014 A1 | 1/2013 | Stewart |
| 2013/0016847 A1 | 1/2013 | Steiner |
| 2013/0028451 A1 | 1/2013 | De Roo |
| 2013/0029684 A1 | 1/2013 | Kawaguchi |
| 2013/0034241 A1 | 2/2013 | Pandey |
| 2013/0039504 A1 | 2/2013 | Pandey |
| 2013/0083911 A1 | 4/2013 | Bathurst |
| 2013/0094689 A1 | 4/2013 | Tanaka |
| 2013/0101141 A1 | 4/2013 | McElveen |
| 2013/0136274 A1 | 5/2013 | Aehgren |
| 2013/0142343 A1 | 6/2013 | Matsui |
| 2013/0147835 A1 | 6/2013 | Lee |
| 2013/0156198 A1 | 6/2013 | Kim |
| 2013/0182190 A1 | 7/2013 | McCartney |
| 2013/0206501 A1 | 8/2013 | Yu |
| 2013/0216066 A1 | 8/2013 | Yerrace |
| 2013/0226593 A1 | 8/2013 | Magnusson |
| 2013/0251181 A1 | 9/2013 | Stewart |
| 2013/0264144 A1 | 10/2013 | Hudson |
| 2013/0271559 A1 | 10/2013 | Feng |
| 2013/0294616 A1 | 11/2013 | Mulder |
| 2013/0297302 A1 | 11/2013 | Pan |
| 2013/0304476 A1 | 11/2013 | Kim |
| 2013/0304479 A1 | 11/2013 | Teller |
| 2013/0329908 A1 | 12/2013 | Lindahl |
| 2013/0332156 A1 | 12/2013 | Tackin |
| 2013/0336516 A1 | 12/2013 | Stewart |
| 2013/0343549 A1 | 12/2013 | Vemireddy |
| 2014/0003635 A1 | 1/2014 | Mohammad |
| 2014/0010383 A1 | 1/2014 | Mackey |
| 2014/0016794 A1 | 1/2014 | Lu |
| 2014/0029761 A1 | 1/2014 | Maenpaa |
| 2014/0037097 A1 | 2/2014 | Labosco |
| 2014/0050332 A1 | 2/2014 | Nielsen |
| 2014/0072151 A1 | 3/2014 | Ochs |
| 2014/0098233 A1 | 4/2014 | Martin |
| 2014/0098964 A1 | 4/2014 | Rosca |
| 2014/0122060 A1 | 5/2014 | Kaszczuk |
| 2014/0177857 A1 | 6/2014 | Kuster |
| 2014/0233777 A1 | 8/2014 | Tseng |
| 2014/0233778 A1 | 8/2014 | Hardiman |
| 2014/0264654 A1 | 9/2014 | Salmon |
| 2014/0265774 A1 | 9/2014 | Stewart |
| 2014/0270271 A1 | 9/2014 | Dehe |
| 2014/0286518 A1 | 9/2014 | Stewart |
| 2014/0295768 A1 | 10/2014 | Wu |
| 2014/0301586 A1 | 10/2014 | Stewart |
| 2014/0307882 A1 | 10/2014 | Leblanc |
| 2014/0314251 A1 | 10/2014 | Rosca |
| 2014/0341392 A1 | 11/2014 | Lambert |
| 2014/0357177 A1 | 12/2014 | Stewart |
| 2014/0363008 A1 | 12/2014 | Chen |
| 2015/0003638 A1 | 1/2015 | Kasai |
| 2015/0025878 A1 | 1/2015 | Gowreesunker |
| 2015/0030172 A1 | 1/2015 | Gaensler |
| 2015/0033042 A1 | 1/2015 | Iwamoto |
| 2015/0050967 A1 | 2/2015 | Bao |
| 2015/0055796 A1 | 2/2015 | Nugent |
| 2015/0055797 A1 | 2/2015 | Nguyen |
| 2015/0063579 A1 | 3/2015 | Bao |
| 2015/0070188 A1 | 3/2015 | Aramburu |
| 2015/0078581 A1 | 3/2015 | Etter |
| 2015/0078582 A1 | 3/2015 | Graham |
| 2015/0097719 A1 | 4/2015 | Balachandreswaran |
| 2015/0104023 A1 | 4/2015 | Bilobrov |
| 2015/0117672 A1 | 4/2015 | Christoph |
| 2015/0118960 A1 | 4/2015 | Petit |
| 2015/0126255 A1 | 5/2015 | Yang |
| 2015/0156578 A1 | 6/2015 | Alexandridis |
| 2015/0163577 A1 | 6/2015 | Benesty |
| 2015/0185825 A1 | 7/2015 | Mullins |
| 2015/0189423 A1 | 7/2015 | Giannuzzi |
| 2015/0208171 A1 | 7/2015 | Funakoshi |
| 2015/0237424 A1 | 8/2015 | Wilker |
| 2015/0281832 A1 | 10/2015 | Kishimoto |
| 2015/0281833 A1 | 10/2015 | Shigenaga |
| 2015/0281834 A1 | 10/2015 | Takano |
| 2015/0312662 A1 | 10/2015 | Kishimoto |
| 2015/0312691 A1 | 10/2015 | Virolainen |
| 2015/0326968 A1 | 11/2015 | Shigenaga |
| 2015/0341734 A1 | 11/2015 | Sherman |
| 2015/0350621 A1 | 12/2015 | Sawa |
| 2015/0358734 A1 | 12/2015 | Butler |
| 2016/0011851 A1 | 1/2016 | Zhang |
| 2016/0021478 A1 | 1/2016 | Katagiri |
| 2016/0029120 A1 | 1/2016 | Nesta |
| 2016/0031700 A1 | 2/2016 | Sparks |
| 2016/0037277 A1 | 2/2016 | Matsumoto |
| 2016/0055859 A1 | 2/2016 | Finlow-Bates |
| 2016/0080867 A1 | 3/2016 | Nugent |
| 2016/0088392 A1 | 3/2016 | Huttunen |
| 2016/0100092 A1 | 4/2016 | Bohac |
| 2016/0105473 A1 | 4/2016 | Klingbeil |
| 2016/0111109 A1 | 4/2016 | Tsujikawa |
| 2016/0127527 A1 | 5/2016 | Mani |
| 2016/0134928 A1 | 5/2016 | Ogle |
| 2016/0142548 A1 | 5/2016 | Pandey |
| 2016/0142814 A1 | 5/2016 | Deroo |
| 2016/0142815 A1 | 5/2016 | Norris |
| 2016/0148057 A1 | 5/2016 | Oh |
| 2016/0150315 A1 | 5/2016 | Tzirkel-Hancock |
| 2016/0150316 A1 | 5/2016 | Kubota |
| 2016/0155455 A1 | 6/2016 | Ojanperä |
| 2016/0165340 A1 | 6/2016 | Benattar |
| 2016/0173976 A1 | 6/2016 | Podhradsky |
| 2016/0173978 A1 | 6/2016 | Li |
| 2016/0189727 A1 | 6/2016 | Wu |
| 2016/0192068 A1 | 6/2016 | Ng |
| 2016/0196836 A1 | 7/2016 | Yu |
| 2016/0234593 A1 | 8/2016 | Matsumoto |
| 2016/0275961 A1 | 9/2016 | Yu |
| 2016/0295279 A1 | 10/2016 | Srinivasan |
| 2016/0300584 A1 | 10/2016 | Pandey |
| 2016/0302002 A1 | 10/2016 | Lambert |
| 2016/0302006 A1 | 10/2016 | Pandey |

(56) References Cited

U.S. PATENT DOCUMENTS

| | | | |
|---|---|---|---|
| 2016/0323667 A1 | 11/2016 | Shumard |
| 2016/0323668 A1 | 11/2016 | Abraham |
| 2016/0330545 A1 | 11/2016 | McElveen |
| 2016/0337523 A1 | 11/2016 | Pandey |
| 2016/0353200 A1 | 12/2016 | Bigeh |
| 2016/0357508 A1 | 12/2016 | Moore |
| 2017/0019744 A1 | 1/2017 | Matsumoto |
| 2017/0064451 A1 | 3/2017 | Park |
| 2017/0105066 A1 | 4/2017 | McLaughlin |
| 2017/0134849 A1 | 5/2017 | Pandey |
| 2017/0134850 A1 | 5/2017 | Graham |
| 2017/0164101 A1 | 6/2017 | Rollow, IV |
| 2017/0180861 A1 | 6/2017 | Chen |
| 2017/0206064 A1 | 7/2017 | Breazeal |
| 2017/0230748 A1 | 8/2017 | Shumard |
| 2017/0264999 A1 | 9/2017 | Fukuda |
| 2017/0303887 A1 | 10/2017 | Richmond |
| 2017/0308352 A1 | 10/2017 | Kessler |
| 2017/0374454 A1 | 12/2017 | Bernardini |
| 2018/0083848 A1 | 3/2018 | Siddiqi |
| 2018/0102136 A1 | 4/2018 | Ebenezer |
| 2018/0109873 A1 | 4/2018 | Xiang |
| 2018/0115799 A1 | 4/2018 | Thiele |
| 2018/0160224 A1 | 6/2018 | Graham |
| 2018/0196585 A1 | 7/2018 | Densham |
| 2018/0219922 A1 | 8/2018 | Bryans |
| 2018/0227666 A1 | 8/2018 | Barnett |
| 2018/0292079 A1 | 10/2018 | Branham |
| 2018/0310096 A1 | 10/2018 | Shumard |
| 2018/0313558 A1 | 11/2018 | Byers |
| 2018/0338205 A1 | 11/2018 | Abraham |
| 2018/0359565 A1 | 12/2018 | Kim |
| 2019/0042187 A1 | 2/2019 | Truong |
| 2019/0166424 A1 | 5/2019 | Harney |
| 2019/0215540 A1 | 7/2019 | Nicol |
| 2019/0230436 A1 | 7/2019 | Tsingos |
| 2019/0259408 A1 | 8/2019 | Freeman |
| 2019/0268683 A1 | 8/2019 | Miyahara |
| 2019/0295540 A1 | 9/2019 | Grima |
| 2019/0295569 A1 | 9/2019 | Wang |
| 2019/0319677 A1 | 10/2019 | Hansen |
| 2019/0371354 A1 | 12/2019 | Lester |
| 2019/0373362 A1 | 12/2019 | Ansai |
| 2019/0385629 A1 | 12/2019 | Moravy |
| 2019/0387311 A1 | 12/2019 | Schultz |
| 2020/0015021 A1 | 1/2020 | Leppanen |
| 2020/0021910 A1 | 1/2020 | Rollow, IV |
| 2020/0037068 A1 | 1/2020 | Barnett |
| 2020/0068297 A1 | 2/2020 | Rollow, IV |
| 2020/0100009 A1 | 3/2020 | Lantz |
| 2020/0100025 A1 | 3/2020 | Shumard |
| 2020/0137485 A1 | 4/2020 | Yamakawa |
| 2020/0145753 A1 | 5/2020 | Rollow, IV |
| 2020/0152218 A1 | 5/2020 | Kikuhara |
| 2020/0162618 A1 | 5/2020 | Enteshari |
| 2020/0228663 A1 | 7/2020 | Wells-Rutherford |
| 2020/0251119 A1 | 8/2020 | Yang |
| 2020/0275204 A1 | 8/2020 | Labosco |
| 2020/0278043 A1 | 9/2020 | Cao |
| 2020/0288237 A1 | 9/2020 | Abraham |
| 2021/0012789 A1 | 1/2021 | Husain |
| 2021/0021940 A1 | 1/2021 | Petersen |
| 2021/0044881 A1 | 2/2021 | Lantz |
| 2021/0051397 A1 | 2/2021 | Veselinovic |
| 2021/0098014 A1 | 4/2021 | Tanaka |
| 2021/0098015 A1 | 4/2021 | Pandey |
| 2021/0120335 A1 | 4/2021 | Veselinovic |
| 2021/0200504 A1 | 7/2021 | Park |
| 2021/0375298 A1 | 12/2021 | Zhang |

FOREIGN PATENT DOCUMENTS

| | | |
|---|---|---|
| CA | 2846323 | 9/2014 |
| CN | 1780495 | 5/2006 |
| CN | 101217830 | 7/2008 |
| CN | 101833954 | 9/2010 |
| CN | 101860776 | 10/2010 |
| CN | 101894558 | 11/2010 |
| CN | 102646418 | 8/2012 |
| CN | 102821336 | 12/2012 |
| CN | 102833664 | 12/2012 |
| CN | 102860039 | 1/2013 |
| CN | 104036784 | 9/2014 |
| CN | 104053088 | 9/2014 |
| CN | 104080289 | 10/2014 |
| CN | 104347076 | 2/2015 |
| CN | 104581463 | 4/2015 |
| CN | 105355210 | 2/2016 |
| CN | 105548998 | 5/2016 |
| CN | 106162427 | 11/2016 |
| CN | 106251857 | 12/2016 |
| CN | 106851036 | 6/2017 |
| CN | 107221336 | 9/2017 |
| CN | 107534725 | 1/2018 |
| CN | 108172235 | 6/2018 |
| CN | 109087664 | 12/2018 |
| CN | 208190895 | 12/2018 |
| CN | 109727604 | 5/2019 |
| CN | 110010147 | 7/2019 |
| CN | 306391029 | 3/2021 |
| DE | 2941485 | 4/1981 |
| EP | 0594098 | 4/1994 |
| EP | 0869697 | 10/1998 |
| EP | 1184676 | 3/2002 |
| EP | 0944228 | 6/2003 |
| EP | 1439526 | 7/2004 |
| EP | 1651001 | 4/2006 |
| EP | 1727344 | 11/2006 |
| EP | 1906707 | 4/2008 |
| EP | 1952393 | 8/2008 |
| EP | 1962547 | 8/2008 |
| EP | 2197219 | 6/2010 |
| EP | 2360940 | 8/2011 |
| EP | 2721837 | 4/2014 |
| EP | 2778310 | 9/2014 |
| EP | 3131311 | 2/2017 |
| GB | 2393601 | 3/2004 |
| GB | 2446620 | 8/2008 |
| JP | S63144699 | 6/1988 |
| JP | H01260967 | 10/1989 |
| JP | H0241099 | 2/1990 |
| JP | H05260589 | 10/1993 |
| JP | H07336790 | 12/1995 |
| JP | 3175622 | 6/2001 |
| JP | 2003087890 | 3/2003 |
| JP | 2004349806 | 12/2004 |
| JP | 2004537232 | 12/2004 |
| JP | 2005323084 | 11/2005 |
| JP | 2006094389 | 4/2006 |
| JP | 2006101499 | 4/2006 |
| JP | 4120646 | 8/2006 |
| JP | 4258472 | 8/2006 |
| JP | 4196956 | 9/2006 |
| JP | 2006340151 | 12/2006 |
| JP | 4760160 | 1/2007 |
| JP | 4752403 | 3/2007 |
| JP | 2007089058 | 4/2007 |
| JP | 4867579 | 6/2007 |
| JP | 2007208503 | 8/2007 |
| JP | 2007228069 | 9/2007 |
| JP | 2007228070 | 9/2007 |
| JP | 2007274131 | 10/2007 |
| JP | 2007274463 | 10/2007 |
| JP | 2007288679 | 11/2007 |
| JP | 2008005347 | 1/2008 |
| JP | 2008042754 | 2/2008 |
| JP | 5028944 | 5/2008 |
| JP | 2008154056 | 7/2008 |
| JP | 2008259022 | 10/2008 |
| JP | 2008263336 | 10/2008 |
| JP | 2008312002 | 12/2008 |
| JP | 2009206671 | 9/2009 |
| JP | 2010028653 | 2/2010 |
| JP | 2010114554 | 5/2010 |

(56) References Cited

FOREIGN PATENT DOCUMENTS

| | | |
|---|---|---|
| JP | 2010268129 | 11/2010 |
| JP | 2011015018 | 1/2011 |
| JP | 4779748 | 9/2011 |
| JP | 2012165189 | 8/2012 |
| JP | 5139111 | 2/2013 |
| JP | 5306565 | 10/2013 |
| JP | 5685173 | 3/2015 |
| JP | 2016051038 | 4/2016 |
| KR | 100298300 | 5/2001 |
| KR | 100960781 | 1/2004 |
| KR | 100901464 | 6/2009 |
| KR | 1020130033723 | 4/2013 |
| KR | 300856915 | 5/2016 |
| TW | 201331932 | 8/2013 |
| TW | I484478 | 5/2015 |
| WO | 1997008896 | 3/1997 |
| WO | 1998047291 | 10/1998 |
| WO | 2000030402 | 5/2000 |
| WO | 2003073786 | 9/2003 |
| WO | 2003088429 | 10/2003 |
| WO | 2004027754 | 4/2004 |
| WO | 2004090865 | 10/2004 |
| WO | 2006049260 | 5/2006 |
| WO | 2006071119 | 7/2006 |
| WO | 2006114015 | 11/2006 |
| WO | 2006121896 | 11/2006 |
| WO | 2007045971 | 4/2007 |
| WO | 2008074249 | 6/2008 |
| WO | 2008125523 | 10/2008 |
| WO | 2009039783 | 4/2009 |
| WO | 2009109069 | 9/2009 |
| WO | 2010001508 | 1/2010 |
| WO | 2010091999 | 8/2010 |
| WO | 2010140084 | 12/2010 |
| WO | 2010144148 | 12/2010 |
| WO | 2011104501 | 9/2011 |
| WO | 2012122132 | 9/2012 |
| WO | 2012140435 | 10/2012 |
| WO | 2012160459 | 11/2012 |
| WO | 2012174159 | 12/2012 |
| WO | 2013016986 | 2/2013 |
| WO | 2013182118 | 12/2013 |
| WO | 2014156292 | 10/2014 |
| WO | 2016176429 | 11/2016 |
| WO | 2016179211 | 11/2016 |
| WO | 2017208022 | 12/2017 |
| WO | 2018140444 | 8/2018 |
| WO | 2018140618 | 8/2018 |
| WO | 2018211806 | 11/2018 |
| WO | 2019231630 | 12/2019 |
| WO | 2020168873 | 8/2020 |
| WO | 2020191354 | 9/2020 |
| WO | 211843001 | 11/2020 |

OTHER PUBLICATIONS

Advanced Network Devices, IPSCM Standard 2' by 2' Ceiling Tile Speaker, 2 pgs.
Affes et al., A Signal Subspace Tracking Algorithm for Microphone Array Processing of Speech, IEEE Trans. On Speech and Audio Processing, vol. 5, No. 5, Sep. 1997, pp. 425-437.
Affes et al., A Source Subspace Tracking Array of Microphones for Double Talk Situations, 1996 IEEE International Conference on Acoustics, Speech, and Signal Processing Conference Proceedings, May 1996, pp. 909-912.
Affes et al., An Algorithm for Multisource Beamforming and Multitarget Tracking, IEEE Trans. On Signal Processing, vol. 44, No. 6, Jun. 1996, pp. 1512-1522.
Affes et al., Robust Adaptive Beamforming via LMS-Like Target Tracking, Proceedings of IEEE International Conference on Acoustics, Speech and Signal Processing, Apr. 1994, pp. IV-269-IV-272.
Armstrong World Industries, Inc., I-Ceilings Sound Systems Speaker Panels, 2002, 4 pgs.
Arnold, et al., "A directional acoustic array using silicon micromachined piezoresistive microphones," Journal of Acoustical Society of America, 113 (1), pp. 289-298, Jan. 2003 (10 pp.).
Atlas Sound, I128SYSM IP Compliant Loudspeaker System with Microphone Data Sheet, 2009, 2 pgs.
Atlas Sound, 1'X2' IP Speaker with Micophone for Suspended Ceiling Systems, https://www.atlasied.com/i128sysm, retrieved Oct. 25, 2017, 5 pgs.
Audio Technica, ES945 Omnidirectional Condenser Boundary Microphones, https://eu.audio-technica.com/resources/ES945%20Specifications.pdf, 2007, 1 pg.
Audix Microphones, Audix Introduces Innovative Ceiling Mics, http://audixusa.com/docs_12/latest_news/EFpIFkAAklOtSdolke.shtml, Jun. 2011, 6 pgs.
Audix Microphones, M70 Flush Mount Ceiling Mic, May 2016, 2 pgs.
Beh et al., Combining Acoustic Echo Cancellation and Adaptive Beamforming for Achieving Robust Speech Interface in Mobile Robot, 2008 IEEE/RSJ International Conference on Intelligent Robots and Systems, Sep. 2008, pp. 1693-1698.
Benesty et al., A New Class of Doubletalk Detectors Based on Cross-Correlation, IEEE Transactions on Speech and Audio Processing, vol. 8, No. 2, Mar. 2000, pp. 168-172.
Benesty et al., Adaptive Algorithms for Mimo Acoustic Echo Cancellation, https://publik.tuwien.ac.at/files/pub-et_9085.pdf, 2003, pp. 1-30.
Benesty et al., Frequency-Domain Adaptive Filtering Revisited, Generalization to the Multi-Channel Case, and Application to Acoustic Echo Cancellation, 2000 IEEE International Conference on Acoustics, Speech, and Signal Processing Proceedings, Jun. 2000, pp. 789-792.
Benesty, et al., "Adaptive Algorithms for Mimo Acoustic Echo Cancellation," AI2 Allen Institute for Artifical Intelligence, 2003.
Beyer Dynamic, Classis BM 32-33-34 DE-EN-FR 2016, 1 pg.
Beyer Dynamic, Classis-BM-33-PZ A1, 1 pg.
Boyd, et al., Convex Optimization, Mar. 15, 1999, 216 pgs.
Brandstein et al., Eds., Microphone Arrays: Signal Processing Techniques and Applications, Digital Signal Processing, Springer-Verlag Berlin Heidelberg, 2001, 401 pgs.
Bruel & Kjaer, by J.J. Christensen and J. Hald, Technical Review: Beamforming, No. 1, 2004, 54 pgs.
BSS Audio, Soundweb London Application Guides, 2010, 120 pgs.
Buchner et al., An Acoustic Human-Machine Interface with Multi-Channel Sound Reproduction, IEEE Fourth Workshop on Multimedia Signal Processing, Oct. 2001, pp. 359-364.
Buchner et al., Full-Duplex Communication Systems Using Loudspeaker Arrays and Microphone Arrays, IEEE International Conference on Multimedia and Expo, Aug. 2002, pp. 509-512.
Buchner et al., An Efficient Combination of Multi-Channel Acoustic Echo Cancellation with a Beamforming Microphone Array, International Workshop on Hands-Free Speech Communication (HSC2001), Apr. 2001, pp. 55-58.
Buchner et al., Generalized Multichannel Frequency-Domain Adaptive Filtering: Efficient Realization and Application to Hands-Free Speech Communication, Signal Processing 85, 2005, pp. 549-570.
Buchner et al., Multichannel Frequency-Domain Adaptive Filtering with Application to Multichannel Acoustic Echo Cancellation, Adaptive Signal Processing, 2003, pp. 95-128.
Buchner, Multichannel Acoustic Echo Cancellation, http://www.buchner-net.com/mcaec.html, Jun. 2011.
Buck, Aspects of First-Order Differential Microphone Arrays in the Presence of Sensor Imperfections, Transactions on Emerging Telecommunications Technologies, vol. 13, No. 2, Mar.-Apr. 2002, pp. 115-122.
Buck, et al., Self-Calibrating Microphone Arrays for Speech Signal Acquisition: A Systematic Approach, Signal Processing, vol. 86, 2006, pp. 1230-1238.
Burton et al., A New Structure for Combining Echo Cancellation and Beamforming in Changing Acoustical Environments, IEEE International Conference on Acoustics, Speech and Signal Processing, 2007, pp. 1-77-1-80.

(56) References Cited

OTHER PUBLICATIONS

Campbell, Adaptive Beamforming Using a Microphone Array for Hands-Free Telephony, Virginia Polytechnic Institute and State University, Feb. 1999, 154 pgs.

Chan et al., Uniform Concentric Circular Arrays with Frequency-Invariant Characteristics—Theory, Design, Adaptive Beamforming and DOA Estimation, IEEE Transactions on Signal Processing, vol. 55, No. 1, Jan. 2007, pp. 165-177.

Chen et al., Design of Robust Broadband Beamformers with Passband Shaping Characteristics using Tikhonov Regularization, IEEE Transactions on Audio, Speech, and Language Processing, vol. 17, No. 4, May 2009, pp. 365-681.

Chen, et al., A General Approach to the Design and Implementation of Linear Differential Microphone Arrays, Asia-Pacific Signal and Information Processing Association Annual Summit and Conference, 2013, 7 pgs.

Chou, "Frequency-Independent Beamformer with Low Response Error," 1995 International Conference on Acoustics, Speech, and Signal Processing, pp. 2995-2998, May 9, 1995, 4 pp.

Chu, Desktop Mic Array for Teleconferencing, 1995 International Conference on Acoustics, Speech, and Signal Processing, May 1995, pp. 2999-3002.

ClearOne Communications, XAP Audio Conferencing White Paper, Aug. 2002, 78 pgs.

ClearOne, Beamforming Microphone Array, Mar. 2012, 6 pgs.

ClearOne, Ceiling Microphone Array Installation Manual, Jan. 9, 2012, 20 pgs.

Cook, et al., An Alternative Approach to Interpolated Array Processing for Uniform Circular Arrays, Asia-Pacific Conference on Circuits and Systems, 2002, pp. 411-414.

Cox et al., Robust Adaptive Beamforming, IEEE Trans. Acoust., Speech, and Signal Processing, vol. ASSP-35, No. 10, Oct. 1987, pp. 1365-1376.

CTG Audio, Ceiling Microphone CTG CM-01, Jun. 5, 2008, 2 pgs.

CTG Audio, CM-01 & CM-02 Ceiling Microphones Specifications, 2 pgs.

CTG Audio, CM-01 & CM-02 Ceiling Microphones, 2017, 4 pgs.

CTG Audio, Expand Your IP Teleconferencing to Full Room Audio, http://www.ctgaudio.com/expand-your-ip-teleconferencing-to-full-room-audio-while-conquering-echo-cancellation-issues.html, Jul. 29, 2014, 3 pgs.

CTG Audio, Expand Your IP Teleconferencing to Full Room Audio, Obtained from website htt. )://www ct audio com/ex and-, our-i -teleconforencino-to-ful-room-audio-while-conquennc.1-echo-cancelation-issues Mull, 2014.

CTG Audio, Installation Manual, Nov. 21, 2008, 25 pgs.

Luo et al., Wideband Beamforming with Broad Nulls of Nested Array, Third Int'l Conf. on Info. Science and Tech., Mar. 23-25, 2013, pp. 1645-1648.

Marquardt et al., A Natural Acoustic Front-End for Interactive TV in the EU-Project Digit, IEEE Pacific Rim Conference on Communications, Computers and Signal Processing, Aug. 2009, pp. 894-899.

Martin, Small Microphone Arrays with Postfilters for Noise and Acoustic Echo Reduction, in Brandstein, ed., Microphone Arrays: Techniques and Applications, 2001, Springer-Verlag Berlin Heidelberg, pp. 255-279.

Maruo et al., On the Optimal Solutions of Beamformer Assisted Acoustic Echo Cancellers, IEEE Statistical Signal Processing Workshop, 2011, pp. 641-644.

McCowan, Microphone Arrays: A Tutorial, Apr. 2001, 36 pgs.

Mohammed, A New Adaptive Beamformer for Optimal Acoustic Echo and Noise Cancellation with Less Computational Load, Canadian Conference on Electrical and Computer Engineering, May 2008, pp. 000123-000128.

Mohammed, A New Robust Adaptive Beamformer for Enhancing Speech Corrupted with Colored Noise, AICCSA, Apr. 2008, pp. 508-515.

Mohammed, Real-time Implementation of an efficient RLS Algorithm based on HR Filter for Acoustic Echo Cancellation, AICCSA, Apr. 2008, pp. 489-494.

Multichannel Acoustic Echo Cancellation, Obtained from website http://www.buchner-net.com/mcaec.html, Jun. 2011.

Myllyla et al., Adaptive Beamforming Methods for Dynamically Steered Microphone Array Systems, 2008 IEEE International Conference on Acoustics, Speech and Signal Processing, Mar.-Apr. 2008, pp. 305-308.

Nguyen-Ky et al., An Improved Error Estimation Algorithm for Sterephonic Acoustic Echo Cancellation Systems, 1st International Conference on Signal Processing and Communication Systems, Dec. 2007, 5 pgs.

Nguyen-Ky, et al., "An Improved Error Estimation Algorithm for Stereophonic Acoustic Echo Cancellation Systems," 1st International Conference on Signal Processing and Communication Systems, Dec. 17-19, 2007.

Oh et al., Hands-Free Voice Communication in an Automobile With a Microphone Array, 1992 IEEE International Conference on Acoustics, Speech, and Signal Processing, Mar. 1992, pp. I-281-I-284.

Omologo, Multi-Microphone Signal Processing for Distant-Speech Interaction, Human Activity and Vision Summer School (HAVSS), INRIA Sophia Antipolis, Oct. 3, 2012, 79 pgs.

Pados et al., An Iterative Algorithm for the Computation of the MVDR Filter, IEEE Trans. On Signal Processing, vol. 49, No. 2, Feb. 2001, pp. 290-300.

Pettersen, Broadcast Applications for Voice-Activated Microphones, db, Jul./Aug. 1985, 6 pgs.

Plascore, PCGA-XR1 3003 Aluminum Honeycomb Data Sheet, 2008, 2 pgs.

Polycom Inc., Vortex EF2211/EF2210 Reference Manual, 2003, 66 pgs.

Polycom, Inc., Polycom Soundstructure C16, C12, C8, and SR12 Design Guide, Nov. 2013, 743 pgs.

Polycom, Inc., Setting Up the Polycom HDX Ceiling Microphone Array Series, https://support.polycom.com/content/dam/polycom-support/products/Telepresence-and-Video/HDX%20Series/setup-maintenance/en/hdx_ceiling_microphone_array_setting_up.pdf, 2010, 16 pgs.

Polycom, Inc., Vortex EF2241 Reference Manual, 2002, 68 pgs.

Powers, Proving Adaptive Directional Technology Works: A Review of Studies, The Hearing Review, http://www.hearingreview.com/2004/04/proving-adaptive-directional-technology-works-a-review-of-studies/, Apr. 2004, 8 pgs.

Rabinkin et al., Estimation of Wavefront Arrival Delay Using the Cross-Power Spectrum Phase Technique, 132nd Meeting of the Acoustical Society of America, Dec. 1996, pp. 1-10.

Rane Acoustic Echo Cancellation Guide, AEC Guide Version 2, Nov. 2013.

Rane Corp., Halogen Acoustic Echo Cancellation Guide, AEC Guide Version 2, Nov. 2013, 16 pgs.

Rao et al., Fast LMS/Newton Algorithms for Sterophonic Acoustic Echo Cancellation, IEEE Transactions on Signal Processing, vol. 57, No. 8, Aug. 2009, pp. 2919-2930.

Rao, et al., "Fast LMS/Newton Algorithms for Stereophonic Acoustic Echo Cancelation," IEEE Transactions on Signal Processing, vol. 57, No. 8, Aug. 2009.

Reuven et al., Joint Acoustic Echo Cancellation and Transfer Function GSC in the Frequency Domain, 23rd IEEE Convention of Electrical and Electronics Engineers in Israel, Sep. 2004, pp. 412-415.

Reuven et al., Joint Noise Reduction and Acoustic Echo Cancellation Using the Transfer-Function Generalized Sidelobe Canceller, Speech Communication, vol. 49, 2007, pp. 623-635.

Reuven et al., Multichannel Acoustic Echo Cancellation and Noise Reduction in Reverberant Environments Using the Transfer-Function GSC, 2007 IEEE International Conference on Acoustics, Speech and Signal Processing—ICASSP 07, Apr. 2007, pp. 1-81-1-84.

Reuven, et al., "Multichannel Acoustic Echo Cancellation and Noise Reduction in Reverberant Environments Using the Transfer-Function GSC," IEEE 1-4244-0728, 2007.

(56) References Cited

OTHER PUBLICATIONS

Ristimaki, Distributed Microphone Array System for Two-Way Audio Communication, Helsinki Univ. of Technology, Master's Thesis, Jun. 15, 2009, 73 pgs.
Rombouts et al., An Integrated Approach to Acoustic Noise and Echo Cancellation, Signal Processing 85, 2005, pp. 349-871.
Sasaki et al., A Predefined Command Recognition System Using a Ceiling Microphone Array in Noisy Housing Environments, 2008 IEEE/RSJ International Conference on Intelligent Robots and Systems, Sep. 2008, pp. 2178-2184.
Sennheiser, New microphone solutions for ceiling and desk installation, https://en-us.sennheiser.com/news-new-microphone-solutions-for-ceiling-and-desk-installation, Feb. 2011, 2 pgs.
Sennheiser, TeamConnect Ceiling, https://en-us.sennheiser.com/conference-meeting-rooms-teamconnect-ceiling, 7 pgs.
Shure AMS Update, vol. 1, No. 1, 1983, 2 pgs.
Shure AMS Update, vol. 1, No. 2, 1983, 2 pgs.
Shure AMS Update, vol. 4, No. 4, 1997, 8 pgs.
Shure Inc., Microflex Advance, http://www.shure.com/americas/microflex-advance, 12 pgs.
Shure Inc., MX395 Low Profile Boundary Microphones, 2007, 2 pgs.
Signal Processor MRX7-D Product Specifications, Yamaha Corporation, 2016.
Silverman et al., Performance of Real-Time Source-Location Estimators for a Large-Aperture Microphone Array, IEEE Transactions on Speech and Audio Processing, vol. 13, No. 4, Jul. 2005, pp. 593-606.
Sinha, Ch. 9: Noise and Echo Cancellation, in Speech Processing in Embedded Systems, Springer, 2010, pp. 127-142.
Soda et al., Introducing Multiple Microphone Arrays for Enhancing Smart Home Voice Control, The Institute of Electronics, Information and Communication Engineers, Technical Report of IEICE, Jan. 2013, 6 pgs.
Soundweb London Application Guides, BSS Audio, 2010.
Symetrix, Inc., SymNet Network Audio Solutions Brochure, 2008, 32 pgs.
SymNet Network Audio Solutions Brochure, Symetrix, Inc., 2008.
Tandon et al., An Efficient, Low-Complexity, Normalized LMS Algorithm for Echo Cancellation, 2nd Annual IEEE Northeast Workshop on Circuits and Systems, Jun. 2004, pp. 161-164.
CTG Audio, White on White—Introducing the CM-02 Ceiling Microphone, https://ctgaudio.com/white-on-white-introducing-the-cm-02-ceiling-microphone/, Feb. 20, 2014, 3 pgs.
Dahl et al., Acoustic Echo Cancelling with Microphone Arrays, Research Report 3/95, Univ. of Karlskrona/Ronneby, Apr. 1995, 64 pgs.
Desiraju et al., Efficient Multi-Channel Acoustic Echo Cancellation Using Constrained Sparse Filter Updates in the Subband Domain, ITG-Fachbericht 252: Speech Communication, Sep. 2014, 4 pgs.
Desiraju, et al., "Efficient Multi-Channel Acoustic Echo Cancellation Using Constrained Sparse Filter Updates in the Subband Domain," Acoustic Speech Enhancement Research, Sep. 2014.
DiBiase et al., Robust Localization in Reverberent Rooms, in Brandstein, ed., Microphone Arrays: Techniques and Applications, 2001, Springer-Verlag Berlin Heidelberg, pp. 157-180.
Do et al., A Real-Time SRP-PHAT Source Location Implementation using Stochastic Region Contraction (SRC) on a Large-Aperture Microphone Array, 2007 IEEE International Conference on Acoustics, Speech and Signal Processing—ICASSP '07, , Apr. 2007, pp. I-121-I-124.
Fan et al., Localization Estimation of Sound Source by Microphones Array, Procedia Engineering 7, 2010, pp. 312-317.
Flanagan et al., Autodirective Microphone Systems, Acustica, vol. 73, 1991, pp. 58-71.
Flanagan et al., Computer-Steered Microphone Arrays for Sound Transduction in Large Rooms, J. Acoust. Soc. Am. 78 (5), Nov. 1985, pp. 1508-1518.
Frost, III, An Algorithm for Linearly Constrained Adaptive Array Processing, Proc. IEEE, vol. 60, No. 8, Aug. 1972, pp. 926-935.

Gannot et al., Signal Enhancement using Beamforming and Nonstationarity with Applications to Speech, IEEE Trans. On Signal Processing, vol. 49, No. 8, Aug. 2001, pp. 1614-1626.
Gansler et al., A Double-Talk Detector Based on Coherence, IEEE Transactions on Communications, vol. 44, No. 11, Nov. 1996, pp. 1421-1427.
Gazor et al., Robust Adaptive Beamforming via Target Tracking, IEEE Transactions on Signal Processing, vol. 44, No. 6, Jun. 1996, pp. 1589-1593.
Gazor et al., Wideband Multi-Source Beamforming with Adaptive Array Location Calibration and Direction Finding, 1995 International Conference on Acoustics, Speech, and Signal Processing, May 1995, pp. 1904-1907.
Gentner Communications Corp., AP400 Audio Perfect 400 Audioconferencing System Installation & Operation Manual, Nov. 1998, 80 pgs.
Gentner Communications Corp., XAP 800 Audio Conferencing System Installation & Operation Manual, Oct. 2001, 152 pgs.
Gil-Cacho et al., Multi-Microphone Acoustic Echo Cancellation Using Multi-Channel Warped Linear Prediction of Common Acoustical Poles, 18th European Signal Processing Conference, Aug. 2010, pp. 2121-2125.
Gritton et al., Echo Cancellation Algorithms, IEEE ASSP Magazine, vol. 1, issue 2, Apr. 1984, pp. 30-38.
Hamalainen et al., Acoustic Echo Cancellation for Dynamically Steered Microphone Array Systems, 2007 IEEE Workshop on Applications of Signal Processing to Audio and Acoustics, Oct. 2007, pp. 58-61.
Herbordt et al., A Real-time Acoustic Human-Machine Front-End for Multimedia Applications Integrating Robust Adaptive Beamforming and Stereophonic Acoustic Echo Cancellation, 7th International Conference on Spoken Language Processing, Sep. 2002, 4 pgs.
Herbordt et al., GSAEC—Acoustic Echo Cancellation embedded into the Generalized Sidelobe Canceller, 10th European Signal Processing Conference, Sep. 2000, 5 pgs.
Herbordt et al., Multichannel Bin-Wise Robust Frequency-Domain Adaptive Filtering and Its Application to Adaptive Beamforming, IEEE Transactions on Audio, Speech, and Language Processing, vol. 15, No. 4, May 2007, pp. 1340-1351.
Herbordt, Combination of Robust Adaptive Beamforming with Acoustic Echo Cancellation for Acoustic Human/Machine Interfaces, Friedrich-Alexander University, 2003, 293 pgs.
Herbordt, et al., Joint Optimization of LCMV Beamforming and Acoustic Echo Cancellation for Automatic Speech Recognition, IEEE International Conference on Acoustics, Speech, and Signal Processing, Mar. 2005, pp. III-77-III-80.
Huang et al., Immersive Audio Schemes: The Evolution of Multiparty Teleconferencing, IEEE Signal Processing Magazine, Jan. 2011, pp. 20-32.
International Search Report and Written Opinion for PCT/US2016/029751 dated Nov. 28, 2016, 21 pp.
International Search Report and Written Opinion for PCT/US2018/013155 dated Jun. 8, 2018.
InvenSense Inc., Microphone Array Beamforming, Dec. 31, 2013, 12 pgs.
Ishii et al., Investigation on Sound Localization using Multiple Microphone Arrays, Reflection and Spatial Information, Japanese Society for Artificial Intelligence, JSAI Technical Report, SIG-Challenge-B202-11, 2012, pp. 64-69.
Ito et al., Aerodynamic/Aeroacoustic Testing in Anechoic Closed Test Sections of Low-speed Wind Tunnels, 16th AIAA/CEAS Aeroacoustics Conference, 2010, 11 pgs.
Johansson et al., Robust Acoustic Direction of Arrival Estimation using Root-SRP-PHAT, a Realtime Implementation, IEEE International Conference on Acoustics, Speech, and Signal Processing, Mar. 2005, 4 pgs.
Johansson, et al., Speaker Localisation using the Far-Field SRP-PHAT in Conference Telephony, 2002 International Symposium on Intelligent Signal Processing and Communication Systems, 5 pgs.
Julstrom et al., Direction-Sensitive Gating: A New Approach to Automatic Mixing, J. Audio Eng. Soc., vol. 32, No. 7/8, Jul./Aug. 1984, pp. 490-506.

(56) References Cited

OTHER PUBLICATIONS

Kahrs, Ed., The Past, Present, and Future of Audio Signal Processing, IEEE Signal Processing Magazine, Sep. 1997, pp. 30-57.
Kallinger et al., Multi-Microphone Residual Echo Estimation, 2003 IEEE International Conference on Acoustics, Speech, and Signal Processing, Apr. 2003, 4 pgs.
Kammeyer, et al., New Aspects of Combining Echo Cancellers with Beamformers, IEEE International Conference on Acoustics, Speech, and Signal Processing, Mar. 2005, pp. III-137-III-140.
Kellermann, A Self-Steering Digital Microphone Array, 1991 International Conference on Acoustics, Speech, and Signal Processing, Apr. 1991, pp. 3581-3584.
Kellermann, Acoustic Echo Cancellation for Beamforming Microphone Arrays, in Brandstein, ed., Microphone Arrays Techniques and Applications, 2001, Springer-Verlag Berlin Heidelberg, pp. 281-306.
Kellermann, Integrating Acoustic Echo Cancellation with Adaptive Beamforming Microphone Arrays, Forum Acusticum, Berlin, Mar. 1999, pp. 1-4.
Kellermann, Strategies for Combining Acoustic Echo Cancellation and Adaptive Beamforming Microphone Arrays, 1997 IEEE International Conference on Acoustics, Speech, and Signal Processing, Apr. 1997, 4 pgs.
Knapp, et al., The Generalized Correlation Method for Estimation of Time Delay, IEEE Transactions on Acoustics, Speech, and Signal Processing, vol. ASSP-24, No. 4, Aug. 1976, pp. 320-327.
Kobayashi et al., A Hands-Free Unit with Noise Reduction by Using Adaptive Beamformer, IEEE Transactions on Consumer Electronics, vol. 54, No. 1, Feb. 2008, pp. 116-122.
Kobayashi et al., A Microphone Array System with Echo Canceller, Electronics and Communications in Japan, Part 3, vol. 89, No. 10, Feb. 2, 2006, pp. 23-32.
Lebret, et al., Antenna Array Pattern Synthesis via Convex Cptimization, IEEE Trans. on Signal Processing, vol. 45, No. 3, Mar. 1997, pp. 526-532.
LecNet2 Sound System Design Guide, Lectrosonics, Jun. 2, 2006.
Lectrosonics, LecNet2 Sound System Design Guide, Jun. 2006, 28 pgs.
Lee et al., Multichannel Teleconferencing System with Multispatial Region Acoustic Echo Cancellation, International Workshop on Acoustic Echo and Noise Control (IWAENC2003), Sep. 2003, pp. 51-54.
Lindstrom et al., An Improvement of the Two-Path Algorithm Transfer Logic for Acoustic Echo Cancellation, IEEE Transactions on Audio, Speech, and Language Processing, vol. 15, No. 4, May 2007, pp. 1320-1326.
Liu et al., Adaptive Beamforming with Sidelobe Control: A Second-Order Cone Programming Approach, IEEE Signal Proc. Letters, vol. 10, No. 11, Nov. 2003, pp. 331-334.
Lobo, et al., Applications of Second-Order Cone Programming, Linear Algebra and its Applications 284, 1998, pp. 193-228.
Tandon, et al., "An Efficient, Low-Complexity, Normalized LMS Algorithm for Echo Cancellation," IEEE 0-7803-8322, Feb. 2004.
Tetelbaum et al., Design and Implementation of a Conference Phone Based on Microphone Array Technology, Proc. Global Signal Processing Conference and Expo (GSPx), Sep. 2004, 6 pgs.
Tiete et al., SoundCompass: A Distributed MEMS Microphone Array-Based Sensor for Sound Source Localization, SENSORS, Jan. 23, 2014, pp. 1918-1949.
Van Compernolle, Switching Adaptive Filters for Enhancing Noisy and Reverberant Speech from Microphone Array Recordings, Proc. IEEE Int. Conf. on Acoustics, Speech, and Signal Processing, Apr. 1990, pp. 833-836.
Van Trees, Optimum Array Processing: Part IV of Detection, Estimation, and Modulation Theory, 2002, 54 pgs., pp. i-xxv, 90-95, 201-230.
Van Veen et al., Beamforming: A Versatile Approach to Spatial Filtering, IEEE ASSP Magazine, vol. 5, issue 2, Apr. 1988, pp. 4-24.

Wang et al., Combining Superdirective Beamforming and Frequency-Domain Blind Source Separation for Highly Reverberant Signals, EURASIP Journal on Audio, Speech, and Music Processing, vol. 2010, pp. 1-13.
Weinstein et al., LOUD: A 1020-Node Microphone Array and Acoustic Beamformer, 14th International Congress on Sound & Vibration, Jul. 2007, 8 pgs.
Wung, "A System Approach to Multi-Channel Acoustic Echo Cancellation and Residual Echo Suppression for Robust Hands-Free Teleconferencing," Georgia Institute of Technology, May 2015.
Wung, A System Approach to Multi-Channel Acoustic Echo Cancellation and Residual Echo Suppression for Robust Hands-Free Teleconferencing, Georgia Institute of Technology, May 2015, 167 pgs.
XAP Audio Conferencing Brochure, ClearOne Communications, Inc., 2002.
Yamaha Conference Echo Canceller PJP-EC200 Brochure, Yamaha Corporation, Oct. 2009.
Yamaha Corp., MRX7-D Signal Processor Product Specifications, 2016, 12 pgs.
Yamaha Corp., PJP-100H IP Audio Conference System Owner's Manual, Sep. 2006, 59 pgs.
Yamaha Corp., PJP-EC200 Conference Echo Canceller, Oct. 2009, 2 pgs.
Yan et al., Convex Optimization Based Time-Domain Broadband Beamforming with Sidelobe Control, Journal of the Acoustical Society of America, vol. 121, No. 1, Jan. 2007, pp. 46-49.
Yensen et al., Synthetic Stereo Acoustic Echo Cancellation Structure with Microphone Array Beamforming for VOIP Conferences, 2000 IEEE International Conference on Acoustics, Speech, and Signal Processing, Jun. 2000, pp. 817-820.
Zhang et al., Multichannel Acoustic Echo Cancellation in Multiparty Spatial Audio Conferencing with Constrained Kalman Filtering, 11th International Workshop on Acoustic Echo and Noise Control, Sep. 2008, 4 pgs.
Zhang et al., Selective Frequency Invariant Uniform Circular Broadband Beamformer, EURASIP Journal on Advances in Signal Processing, vol. 2010, pp. 1-11.
Zhang, et al., "Multichannel Acoustic Echo Cancelation in Multiparty Spatial Audio Conferencing with Constrained Kalman Filtering," 11 h International Workshop on Acoustic Echo and Noise Control, Sep. 14, 2008.
Zheng et al., Experimental Evaluation of a Nested Microphone Array with Adaptive Noise Cancellers, IEEE Transactions on Instrumentation and Measurement, vol. 53, No. 3, Jun. 2004, p. 777-786.
Armstrong, Ceiling Systems, Brochure page for Armstrong Softlook, 1995, 2 pp.
Armstrong, i-Ceilings, Brochure, 2009, 12 pp.
Benesty, et. al., "Microphone Array Signal Processing," Springer, 2010, 20 pp.
BZ-3a Installation Instructions, XEDIT Corporation, Available at <chrome-extension://efaidnbmnnnibpcajpcglclefindmkaj/viewer.html?pdfurl=https%3A%2F%2Fwww.servoreelers.com%2Fmt-content%2Fuploads%2F2017%2F05%2Fbz-a-3universal-2017c.pdf&clen=189067&chunk=true>, 1 p.
Cao, "Survey on Acoustic Vector Sensor and its Applications in Signal Processing" Proceedings of the 33rd Chinese Control Conference, Jul. 2014, 17 pp.
ClearOne Launches Second Generation of its Groundbreaking Beamforming Microphone Array, Press Release, Acquire Media, Jun. 1, 2016, 2 pp.
ClearOne to Unveil Beamforming Microphone Array with Adaptive Steering and Next Generation Acoustic Echo Cancellation Technology, Press Release, InfoComm, Jun. 4, 2012, 1 p.
CTG Audio, CTG FS-400 and RS-800 with "Beamforming" Technology, Datasheet, As early as 2009, 2 pp.
CTG Audio, CTG User Manual for the FS-400/800 Beamforming Mixers, Nov. 2008, 26 pp.
CTG Audio, Frequently Asked Questions, As early as 2009, 2 pp.
CTG Audio, Installation Manual and User Guidelines for the Soundman SM 02 System, May 2001, 29 pp.
CTG Audio, Introducing the CTG FS-400 and FS-800 with Beamforming Technology, As early as 2008, 2 pp.

(56) References Cited

OTHER PUBLICATIONS

CTG Audio, Meeting the Demand for Ceiling Mics in the Enterprise 5 Best Practices, Brochure, 2012, 9 pp.
Digikey webpage for Converta box (last visited Apr. 22, 2020) <https://www.digikey.com/product-detail/en/bud-industries/CU-452-A/377-1969-ND/439257?utm_adgroup=Boxes&utm_source=google&utm_medium=cpc&utm_campaign=Shopping_Boxes%2C%20Enclosures%2C%20Racks_NEW&utm_term=&utm_content=Boxes&gclid=EAIaIQobChMI2JTw-Ynm6AIVgbblCh3F4QKuEAkYCSABEgKybPD_BwE>, 3 pp.
Digikey webpage for Pomona Box (last visited Apr. 22, 2020) available at <https://www.digikey.com/product-detail/en/pomonaelectronics/3306/501-2054-ND/736489>, 2 pp.
Digital Wireless Conference System, MCW-D 50, Beyerdynamic Inc., 2009, 18 pp.
Eargle, "The Microphone Handbook," Elar Publ. Co., 1st ed., 1981, 4 pp.
Enright, Notes From Logan, June edition of Scanlines, Jun. 2009, 9 pp.
Hald, et al., "A class of optimal broadband phased array geometries designed for easy construction," 2002 Int'l Congress & Expo. on Noise Control Engineering, Aug. 2002, 6 pp.
Invensense, Recommendations for Mounting and Connecting InvenSense MEMS Microphones, Application Note AN-1003, 2013, 11 pp.
Johnson, et al., "Array Signal Processing: Concepts and Techniques," p. 59, Prentice Hall, 1993, 3 pp.
Klegon, "Achieve Invisible Audio with the MXA910 Ceiling Array Microphone," Jun. 27, 2016, 10 pp.
Lai, et al., "Design of Robust Steerable Broadband Beamformers with Spiral Arrays and the Farrow Filter Structure," Proc. Intl. Workshop Acoustic Echo Noise Control, 2010, 4 pp.
Li, "Broadband Beamforming and Direction Finding Using Concentric Ring Array," Ph.D. Dissertation, University of Missouri-Columbia, Jul. 2005, 163 pp.
Liu, et al., "Wideband Beamforming," Wiley Series on Wireless Communications and Mobile Computing, pp. 143-198, 2010, 297 pp.
MFLCRFG Datasheet, Metal_Fab Inc., Sep. 7, 2007, 1 p.
Milanovic, et al., "Design and Realization of FPGA Platform for Real Time Acoustic Signal Acquisition and Data Processing" 22nd Telecommunications Forum TELFOR, 2014, 6 pp.
Pomona, Model 3306, Datasheet, Jun. 9, 1999, 1 p.
Prime, et al., "Beamforming Array Optimisation Averaged Sound Source Mapping on a Model Wind Turbine," ResearchGate, Nov. 2014, 10 pp.
Sessler, et al., "Toroidal Microphones," Journal of Acoustical Society of America, vol. 46, No. 1, 1969, 10 pp.
Shure Debuts Microflex Advance Ceiling and Table Array Microphones, Press Release, Feb. 9, 2016, 4 pp.
Shure, MXA910 With IntelliMix, Ceiling Array Microphone, available at <https://www.shure.com/en-US/products/microphones/mxa910>, as early as 2020, 12 pp.
Shure, New MXA910 Variant Now Available, Press Release, Dec. 13, 2019, 5 pp.
Shure, Q&A in Response to Recent Us Court Ruling on Shure MXA910, Available at <https://www.shure.com/en-US/meta/legal/q-and-a-inresponse-to-recent-us-court-ruling-on-shure-mxa910-response>, As early as 2020, 5 pp.
Shure, RK244G Replacement Screen and Grille, Datasheet, 2013, 1 p.
Shure, The Microflex Advance MXA310 Table Array Microphone, Available at <https://www.shure.com/en-US/products/microphones/mxa310>, As early as 2020, 12 pp.
Vicente, "Adaptive Array Signal Processing Using the Concentric Ring Array and the Spherical Array," Ph.D. Dissertation, University of Missouri, May 2009, 226 pp.
Warsitz, et al., "Blind Acoustic Beamforming Based on Generalized Eigenvalue Decomposition," IEEE Transactions on Audio, Speech and Language Processing, vol. 15, No. 5, 2007, 11 pp.
"Philips Hue Bulbs and Wireless Connected Lighting System," Web page https://www.philips-hue.com/en-in, 8 pp, Sep. 23, 2020, retrieved from Internet Archive Wayback Machine, <https://web.archive.org/web/20200923171037/https://www.philips-hue.com/en-in> on Sep. 27, 2021.
"Vsa 2050 II Digitally Steerable Column Speaker," Web page https://www.rcf.it/en_US/products/product-detail/vsa-2050-ii/972389, 15 pages, Dec. 24, 2018.
Ahonen, et al, "Directional Analysis of Sound Field with Linear Microphone Array and Applications in Sound Reproduction," Audio Engineering Socity, Convention Paper 7329, May 2008, 11 pp.
Alarifi, et al., "Ultra Wideband Indoor Positioning Technologies: Analysis and Recent Advances," Sensors 2016, vol. 16, No. 707, 36 pp.
Amazon webpage for Metalfab MFLCRFG (last visited Apr. 22, 2020) available at <https://www.amazon.com/RETURN-FILTERGRILLE-Drop-Ceiling/dp/B0064Q9A7l/ref=sr_12?dchild=1&keywords=drop+ceiling+return+air+grille&gid=1585862723&s=hi&sr=1-2>, 11 pp.
Armstrong "Walls" Catalog available at <https://www.armstrongceilings.com/content/dam/armstrongceilings/commercial/north-america/catalogs/armstrong-ceilings-wallsspecifiers-reference.pdf>, 2019, 30 pp.
Armstrong Tectum Ceiling & Wall Panels Catalog available at <https://www.armstrongceilings.com/content/dam/armstrongceilings/commercial/north-america/brochures/tectum-brochure.pdf>, 2019, 16 pp.
Armstrong Woodworks Concealed Catalog available at <https://sweets.construction.com/swts_content_files/3824/442581.pdf>, 2014, 6 pp.
Armstrong Woodworks Walls Catalog available at <https://www.armstrongceilings.com/pdbupimagesclg/220600.pdf/download/datasheet-woodworks-walls.pdf>, 2019, 2 pp.
Armstrong, Acoustical Design: Exposed Structure, available at <https://www.armstrongceilings.com/pdbupimagesclg/217142.pdf/download/acoustical-design-exposed-structurespaces-brochure.pdf>, 2018, 19 pp.
Armstrong, Excerpts from Armstrong 2011-2012 Ceiling Wall Systems Catalog, available at <https://web.archive.org/web/20121116034120/http://www.armstrong.com/commceilingsna/en_us/pdf/ceilings_catalog_screen-2011.pdf>, as early as 2012, 162 pp.
Automixer Gated, Information Sheet, MIT, Nov. 2019, 9 pp.
AVNetwork, "Top Five Conference Room Mic Myths," Feb. 25, 2015, 14 pp.
Benesty, et al., "Differential Beamforming," Fundamentals of Signal Enhancement and Array Signal Processing, First Edition, 2017, 39 pp.
Berkun, et al., "Combined Beamformers for Robust Broadband Regularized Superdirective Beamforming," IEEE/ACM Transactions on Audio, Speech, and Language Processing, vol. 23, No. 5, May 2015, 10 pp.
BNO055, Intelligent 9-axis absolute orientation sensor, Data sheet, Bosch, Nov. 2020, 118 pp.
Brooks, et al., "A Quantitative Assessment of Group Delay Methods for Identifying Glottal Closures in Voiced Speech," IEEE Transaction on Audio, Speech, and Language Processing, vol. 14, No. 2, Mar. 2006, 11 pp.
Buck, et al., "First Order Differential Microphone Arrays for Automotive Applications," 7th International Workshop on Acoustic Echo and Noise Control, Darmstadt University of Technology, Sep. 10-13, 2001, 4 pp.
Cabral, et al., Glottal Spectral Separation for Speech Synthesis, IEEE Journal of Selected Topics in Signal Processing, 2013, 15 pp.
Canetto, et al., "Speech Enhancement Systems Based on Microphone Arrays," VI Conference of the Italian Society for Applied and Industrial Mathematics, May 27, 2002, 9 pp.
Cech, et al., "Active-Speaker Detection and Localization with Microphones and Cameras Embedded into a Robotic Head," IEEE-RAS International Conference on Humanoid Robots, Oct. 2013, pp. 203-210.
Chau, et al., "A Subband Beamformer on an Ultra Low-Power Miniature DSP Platform," 2002 IEEE International Conference on Acoustics, Speech, and Signal Processing, 4 pp.

(56) References Cited

OTHER PUBLICATIONS

Chen, et al., "Design and Implementation of Small Microphone Arrays," PowerPoint Presentation, Northwestern Polytechnical University and Institut national de la recherche scientifigue, Jan. 1, 2014, 56 pp.

ClearOne Introduces Ceiling Microphone Array With Built-In Dante Interface, Press Release; GlobeNewswire, Jan. 8, 2019, 2 pp.

ClearOne, Clearly Speaking Blog, "Advanced Beamforming Microphone Array Technology for Corporate Conferencing Systems," Nov. 11, 2013, 5 pp., http://www.clearone.com/blog/advanced-beamforming-microphone-array-technology-for-corporate-conferencing-systems/.

ClearOne, Converge/Converge Pro, Manual, 2008, 51 pp.

ClearOne, Professional Conferencing Microphones, Brochure, Mar. 2015, 3 pp.

Coleman, "Loudspeaker Array Processing for Personal Sound Zone Reproduction," Centre for Vision, Speech and Signal Processing, 2014, 239 pp.

Decawave, Application Note: APR001, UWB Regulations, A Summary of Worldwide Telecommunications Regulations governing the use of Ultra-Wideband radio, Version 1.2, 2015, 63 pp.

Diethorn, "Audio Signal Processing For Next-Generation Multimedia Communication Systems," Chapter 4, 2004, 9 pp.

Dominguez, et al., "Towards an Environmental Measurement Cloud: Delivering Pollution Awareness to the Public," International Journal of Distributed Sensor Networks, vol. 10, Issue 3, Mar. 31, 2014, 17 pp.

Dormehl, "HoloLens concept lets you control your smart home via augmented reality," digitaltrends, Jul. 26, 2016, 12 pp.

Firoozabadi, et al., "Combination of Nested Microphone Array and Subband Processing for Multiple Simultaneous Speaker Localization," 6th International Symposium on Telecommunications, Nov. 2012, pp. 907-912.

Fohhn Audio New Generation of Beam Steering Systems Available Now, audioXpress Staff, May 10, 2017, 8 pp.

Fox, et al., "A Subband Hybrid Beamforming for In-Car Speech Enhancement," 20th European Signal rocessing Conference, Aug. 2012, 5 pp.

Giuliani, et al., "Use of Different Microphone Array Configurations for Hands-Free Speech Recognition in Noisy and Reverberant Environment," IRST—Istituto per la Ricerca Scientifica e Tecnologica, Sep. 22, 1997, 4 pp.

Hayo, Virtual Controls for Real Life, Web page downloaded from https://hayo.io/ on Sep. 18, 2019, 19 pp.

Holm, "Optimizing Microphone Arrays for use in Conference Halls," Norwegian University of Science and Technology, Jun. 2009, 101 pp.

ICONYX Gen5, Product Overview; Renkus-Heinz, Dec. 24, 2018, 2 pp.

International Search Report and Written Opinion for PCT/US2016/022773 dated Jun. 10, 2016.

International Search Report and Written Opinion for PCT/US2019/031833 dated Jul. 24, 2019, 16 pp.

International Search Report and Written Opinion for PCT/US2019/033470 dated Jul. 31, 2019, 12 pp.

International Search Report and Written Opinion for PCT/US2019/051989 dated Jan. 10, 2020, 15 pp.

International Search Report and Written Opinion for PCT/US2020/024063 dated Aug. 31, 2020, 18 pp.

International Search Report and Written Opinion for PCT/US2020/035185 dated Sep. 15, 2020, 11 pp.

International Search Report and Written Opinion for PCT/US2020/058385 dated Mar. 31, 2021, 20 pp.

International Search Report and Written Opinion for PCT/US2021/070625 dated Sep. 17, 2021, 17 pp.

International Search Report for PCT/US2020/024005 dated Jun. 12, 2020, 12 pp.

Kolundžija, et al., "Baffled circular loudspeaker array with broadband high directivity," 2010 IEEE International Conference on Acoustics, Speech and Signal Processing, Dallas, TX, 2010, pp. 73-76.

Liu, et al., "Frequency Invariant Beamforming in Subbands," IEEE Conference on Signals, Systems and Computers, 2004, 5 pp.

Microphone Array Primer, Shure Question and Answer Page, <https://service.shure.com/s/article/microphone-array-primer?language=en_US>, Jan. 2019, 5 pp.

Mohan, et al., "Localization of multiple acoustic sources with small arrays using a coherence test," Journal Acoustic Soc Am., 123(4), Apr. 2008, 12 pp.

Moulines, et al., "Pitch-Synchronous Waveform Processing Techniques for Text-to-Speech Synthesis Using Diphones," Speech Communication 9, 1990, 15 pp.

New Shure Microflex Advance MXA910 Microphone With Intellimix Audio Processing Provides Greater Simplicity, Flexibility, Clarity, Press Release, Jun. 12, 2019, 4 pp.

Office Action for Taiwan Patent Application No. 105109900 dated May 5, 2017.

Office Action issued for Japanese Patent Application No. 2015-023781 dated Jun. 20, 2016, 4 pp.

Olszewski, et al., "Steerable Highly Directional Audio Beam Loudspeaker," Interspeech 2005, 4 pp.

Order, Conduct of the Proceeding, *Clearone, Inc.* v. *Shure Acquisition Holdings, Inc.*, Nov. 2, 2020, 10 pp.

Palladino, "This App Lets You Control Your Smarthome Lights via Augmented Reality," Next Reality Mobile AR News, Jul. 2, 2018, 5 pp.

Parikh, et al., "Methods for Mitigating IP Network Packet Loss in Real Time Audio Streaming Applications," GatesAir, 2014, 6 pp.

Pasha, et al., "Clustered Multi-channel Dereverberation for Ad-hoc Microphone Arrays," Proceedings of APSIPA Annual Summit and Conference, Dec. 2015, pp. 274-278.

Petitioner's Motion for Sanctions, *Clearone, Inc.* v. *Shure Acquisition Holdings, Inc.*, Aug. 24, 2020, 20 pp.

Pfeifenberger, et al., "Nonlinear Residual Echo Suppression using a Recurrent Neural Network," Interspeech 2020, 5 pp.

Phoenix Audio Technologies, "Beamforming and Microphone Arrays—Common Myths", Apr. 2016, http://info.phnxaudio.com/blog/microphone-arrays-beamforming-myths-1, 19 pp.

Polycom, Inc., Vortex EF2280 Reference Manual, 2001, 60 pp.

Sällberg, "Faster Subband Signal Processing," IEEE Signal Processing Magazine, vol. 30, No. 5, Sep. 2013, 6 pp.

SerDes, Wikipedia article, last edited on Jun. 25, 2018; retrieved on Jun. 27, 2018, 3 pp., https://en.wikipedia.org/wiki/SerDes.

Sessler, et al., "Directional Transducers," IEEE Transactions on Audio and Electroacoustics, vol. AU-19, No. 1, Mar. 1971, pp. 19-23.

Shure Inc., A910-HCM Hard Ceiling Mount, retrieved from website <http://www.shure.com/en-US/products/accessories/a910hcm> on Jan. 16, 2020, 3 pp.

Tan, et al., "Pitch Detection Algorithm: Autocorrelation Method and AMDF," Department of Computer Engineering, Prince of Songkhla University, Jan. 2003, 6 pp.

Togami, et al., "Subband Beamformer Combined with Time-Frequency ICA for Extraction of Target Source Under Reverberant Environments," 17th European Signal Processing Conference, Aug. 2009, 5 pp.

U.S. Appl. No. 16/598,918, filed Oct. 10, 2019, 50 pp.

Weinstein, et al., "LOUD: A 1020-Node Modular Microphone Array and Beamformer for Intelligent Computing Spaces," MIT Computer Science and Artifical Intelligence Laboratory, 2004, 18 pp.

Yermeche, et al., "Real-Time DSP Implementation of a Subband Beamforming Algorithm for Dual Microphone Speech Enhancement," 2007 IEEE International Symposium on Circuits and Systems, 4 pp.

Zavarehei, et al., "Interpolation of Lost Speech Segments Using LP-HNM Model with Codebook Post-Processing," IEEE Transactions on Multimedia, vol. 10, No. 3, Apr. 2008, 10 pp.

(56) References Cited

OTHER PUBLICATIONS

Zhang, et al., "F-T-LSTM based Complex Network for Joint Acoustic Echo Cancellation and Speech Enhancement," Audio, Speech and Language Processing Group, Jun. 2021, 5 pp.

* cited by examiner

POST-MIXING ACOUSTIC ECHO CANCELLATION SYSTEMS AND METHODS

CROSS-REFERENCE

This application is a continuation of U.S. patent application Ser. No. 15/406,172, filed on Jan. 13, 2017, the contents of which are referenced herein in their entirety.

TECHNICAL FIELD

This application generally relates to acoustic echo cancellation performed after the mixing of audio signals from a plurality of acoustic sources, such as microphones used in a conferencing system. In particular, this application relates to systems and methods for cancelling and suppressing acoustic echo from the output of a mixer while efficiently utilizing computation resources.

BACKGROUND

Conferencing environments, such as boardrooms, conferencing settings, and the like, can involve the use of microphones for capturing sound from audio sources and loudspeakers for presenting audio from a remote location (also known as a far end). For example, persons in a conference room may be conducting a conference call with persons at a remote location. Typically, speech and sound from the conference room may be captured by microphones and transmitted to the remote location, while speech and sound from the remote location may be received and played on loudspeakers in the conference room. Multiple microphones may be used in order to optimally capture the speech and sound in the conference room.

However, the microphones may pick up the speech and sound from the remote location that is played on the loudspeakers. In this situation, the audio transmitted to the remote location may therefore include an echo, i.e., the speech and sound from the conference room as well as the speech and sound from the remote location. If there is no correction, the audio transmitted to the remote location may therefore be low quality or unacceptable because of this echo. In particular, it would not be desirable for persons at the remote location to hear their own speech and sound.

Existing echo cancellation systems may utilize an acoustic echo canceller for each of the multiple microphones, and a mixer can subsequently mix and process each echo-cancelled microphone signal. However, these types of systems may be computationally intensive and complex. For example, separate and dedicated processing may be needed to perform acoustic echo cancellation on each microphone signal. Furthermore, a typical acoustic echo canceller placed after a mixer would work poorly due to the need to constantly readapt to the mixed signal generated by the mixer should the mixer be dynamic, i.e., the gains on one or more of the mixer channels changes over time.

Accordingly, there is an opportunity for acoustic echo cancellation systems and methods that address these concerns. More particularly, there is an opportunity for acoustic echo cancellation systems and methods that cancel and suppress acoustic echo and work with a mixer that has mixed the audio of multiple acoustic sources, while being computationally efficient and resource-friendly.

SUMMARY

The invention is intended to solve the above-noted problems by providing acoustic echo cancellation systems and methods that are designed to, among other things: (1) generate an echo-cancelled mixed audio signal based on a mixed audio signal from a mixer, information gathered from the audio signal from each of the plurality of acoustic sources, and a remote audio signal; (2) generate the echo-cancelled mixed audio signal by selecting various tap coefficients of a background filter performing a normalized least-mean squares algorithm, a hidden filter, and a mix filter, based on comparing a background error power and a hidden error power; and (3) use a non-linear processor to generate an echo-suppressed mixed audio signal from the echo-cancelled mixed audio signal when the background filter and hidden filter have not yet converged.

In an embodiment, a system includes a memory, a plurality of acoustic sources, a mixer in communication with the plurality of acoustic sources and the memory, and an acoustic echo canceller in communication with the mixer, the memory, and a remote audio signal. The plurality of acoustic sources may each be configured to generate an audio signal. The mixer may be configured to mix the audio signal from each of the plurality of acoustic sources to produce a mixed audio signal. The acoustic echo canceller may be configured to generate an echo-cancelled mixed audio signal based on the mixed audio signal, information gathered from each of the plurality of acoustic sources, and the remote audio signal.

In another embodiment, a method includes receiving an audio signal from each of a plurality of acoustic sources; receiving a remote audio signal; mixing the audio signal from each of the plurality of acoustic sources using a mixer to produce a mixed audio signal; and generating an echo-cancelled mixed audio signal based on the mixed audio signal, information gathered from the audio signal from each of the plurality of acoustic sources, and the remote audio signal, using an acoustic echo canceller.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
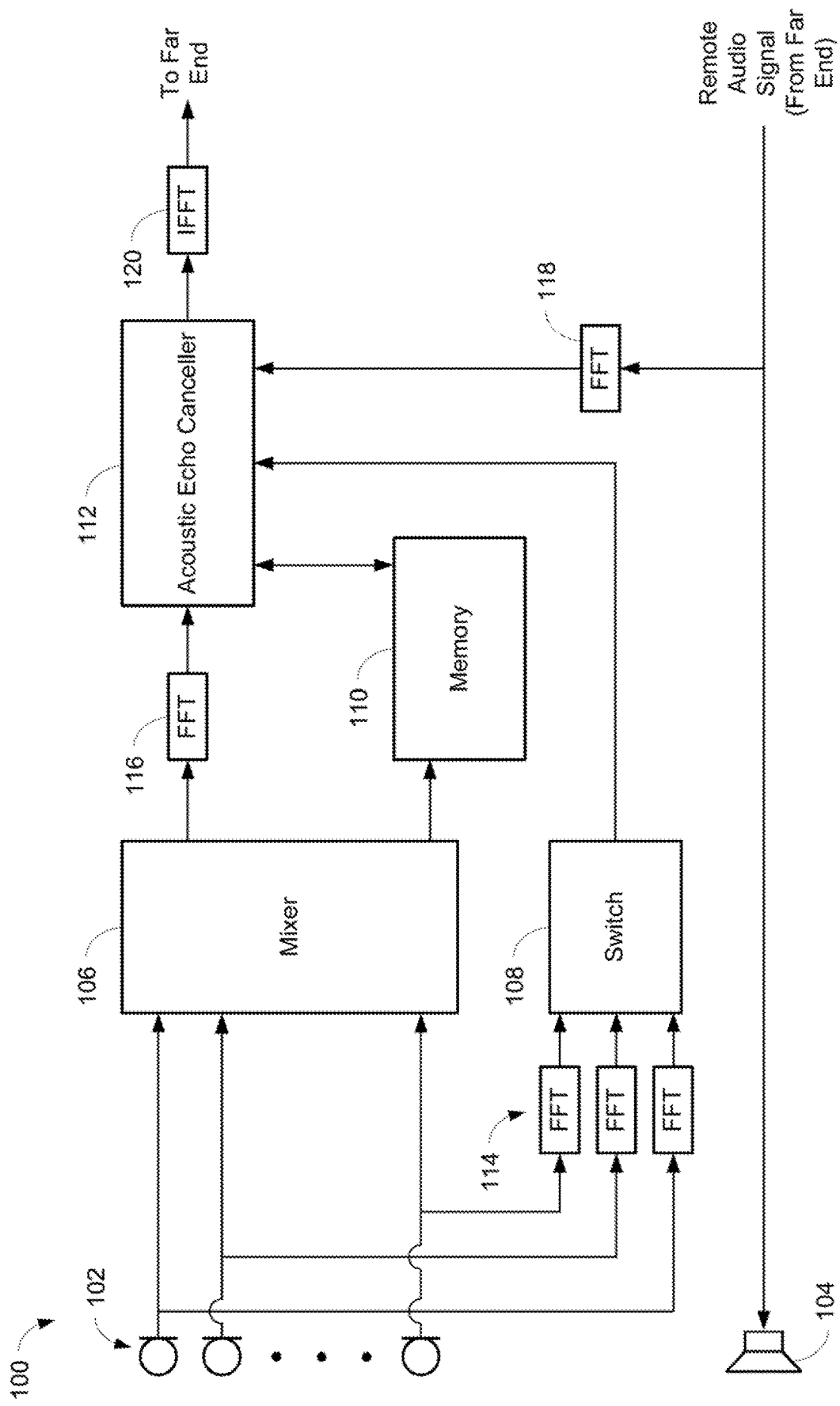
FIG. 1 is a schematic diagram of a communication system including an acoustic echo canceller, in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

The acoustic echo cancellation systems and methods described herein can generate an echo-cancelled mixed audio signal based on a mixed audio signal from a mixer, information gathered from the audio signal from each of the plurality of acoustic sources, and a remote audio signal, while being computationally efficient and resource-friendly. The systems and methods may eliminate the need for separate acoustic echo cancellers for each acoustic source, e.g., microphone, while maintaining the cancellation benefits of separate acoustic echo cancellers. Moreover, the decreased computational load may allow the use of less expensive hardware (e.g., processor and/or DSP), and/or enable other features to be included in the communication system 100. User satisfaction may be increased through use of the communication system 100 and acoustic echo canceller 112.

Figure 2:
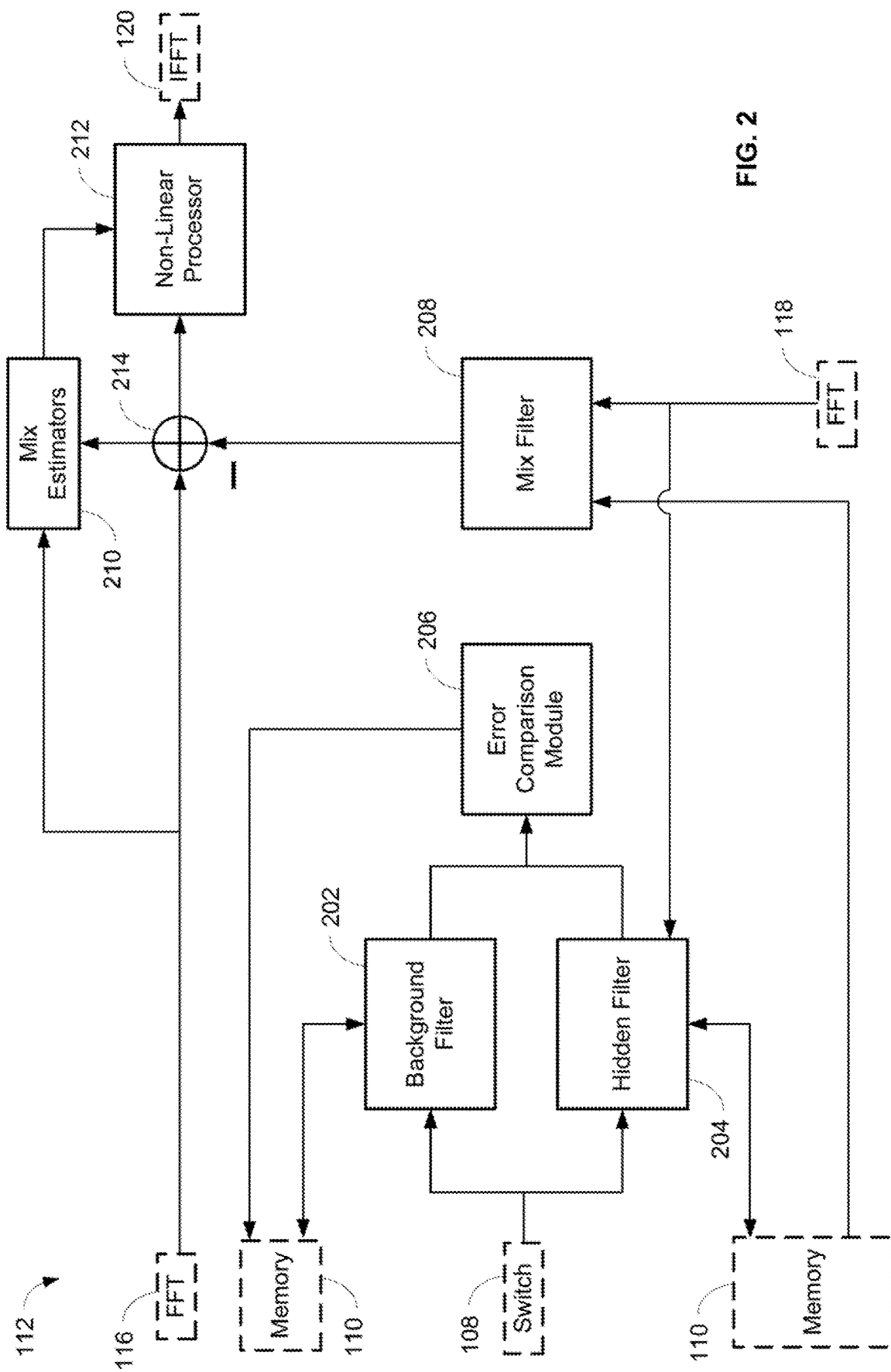
FIG. 2 is a schematic diagram of an acoustic echo canceller for use in the communication system of FIG. 1, in accordance with some embodiments.

FIG. 1 is a schematic diagram of a communication system 100 for capturing sound from audio sources in an environment using microphones 102 and presenting audio from a remote location using a loudspeaker 104. FIG. 2 is a schematic diagram of the acoustic echo canceller 112 included in the communication system 100. The communication system 100 may generate an echo-cancelled mixed audio signal using the acoustic echo canceller 112 that processes a mixed audio signal from a mixer 106. The echo-cancelled mixed audio signal may mitigate the sound received from the remote location that is played on the loudspeaker 104. In this way, the echo-cancelled mixed audio signal may be transmitted to the remote location without the undesirable echo of persons at the remote location hearing their own speech and sound.

Environments such as conference rooms may utilize the communication system 100 to facilitate communication with persons at the remote location, for example. The types of microphones 102 and their placement in a particular environment may depend on the locations of audio sources, physical space requirements, aesthetics, room layout, and/or other considerations. For example, in some environments, the microphones may be placed on a table or lectern near the audio sources. In other environments, the microphones may be mounted overhead to capture the sound from the entire room, for example. The communication system 100 may work in conjunction with any type and any number of microphones 102. Various components included in the communication system 100 may be implemented using software executable by one or more servers or computers, such as a computing device with a processor and memory, and/or by hardware (e.g., discrete logic circuits, application specific integrated circuits (ASIC), programmable gate arrays (PGA), field programmable gate arrays (FPGA), etc.

Figure 3:
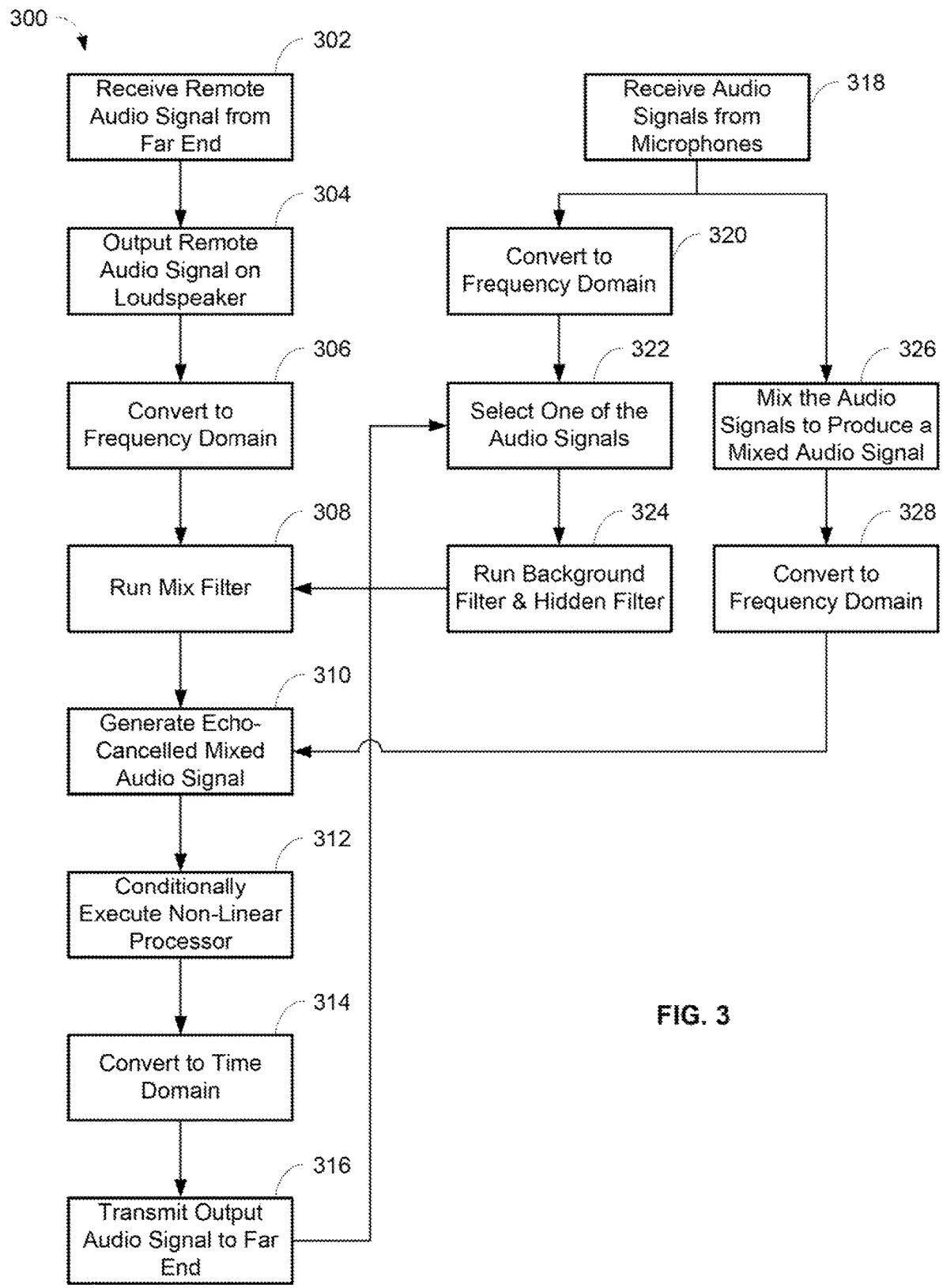
FIG. 3 is a flowchart illustrating operations for performing acoustic echo cancellation using the communication system of FIG. 1, in accordance with some embodiments.
Figure 4:
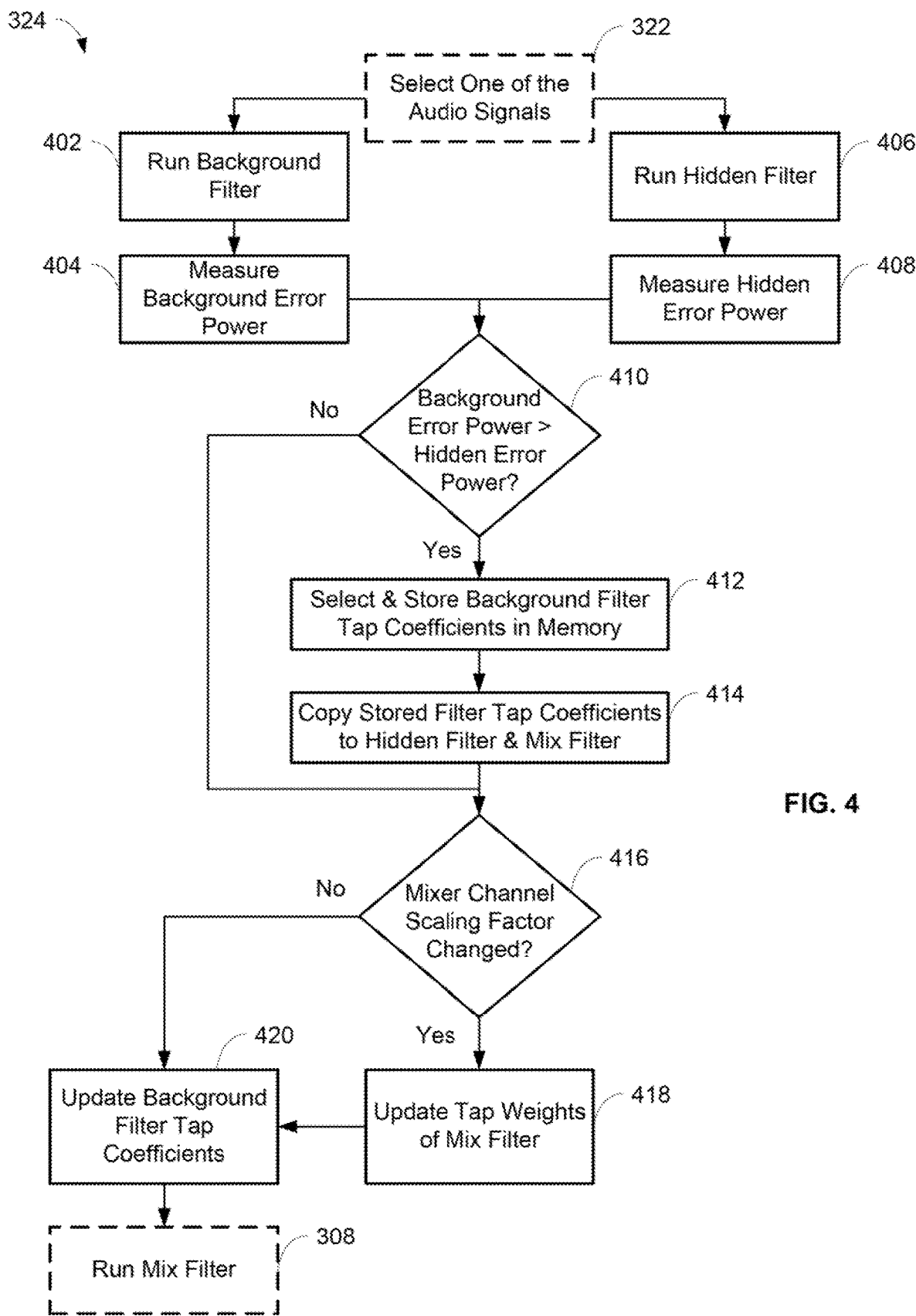
FIG. 4 is a flowchart illustrating operations for running a background filter and a hidden filter while performing acoustic echo cancellation using the communication system of FIG. 1, in accordance with some embodiments.
Figure 5:
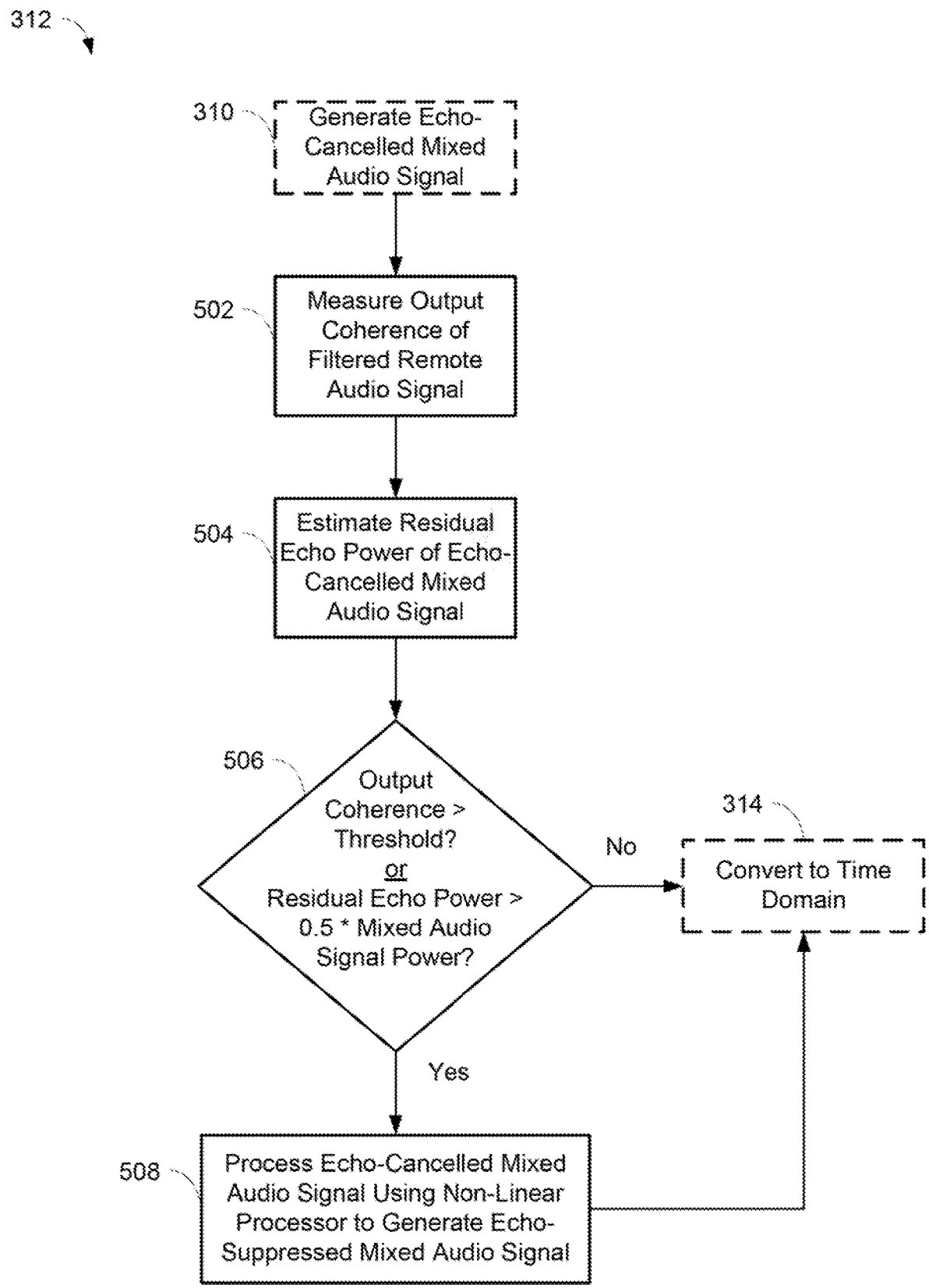
FIG. 5 is a flowchart illustrating operations for running a non-linear processor to generate an echo-suppressed mixed audio signal using the communication system of FIG. 1, in accordance with some embodiments.

FIGS. 3-5 illustrate embodiments of methods for utilizing the communication system 100 and the acoustic echo canceller 112. In particular, FIG. 3 illustrates a process 300 for performing acoustic echo cancellation using the communication system 100, FIG. 4 illustrates a method 324 for running a background filter 202 and a hidden filter 204 in the acoustic echo canceller 112, and FIG. 5 illustrates a method 312 for conditionally running a non-linear processor 212 in the acoustic echo canceller 112. In general, a computer program product in accordance with the embodiments includes a computer usable storage medium (e.g., standard random access memory (RAM), an optical disc, a universal serial bus (USB) drive, or the like) having computer-readable program code embodied therein, wherein the computer-readable program code is adapted to be executed by a processor (e.g., working in connection with an operating system) to implement the methods described below. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Referring to FIG. 1, the communication system 100 may include the microphones 102, the loudspeaker 104, a mixer 106, a switch 108, a memory 110, the acoustic echo canceller 112, fast Fourier transform (FFT) modules 114, 116, 118, and an inverse fast Fourier transform module 120. Each of the microphones 102 may detect sound in the environment and convert the sound to an audio signal. In embodiments, some or all of the audio signals from the microphones 102 may be processed by a beamformer (not shown) to generate one or more beamformed audio signals, as is known in the art. Accordingly, while the systems and methods are described herein as using audio signals from microphones 102, it is contemplated that the systems and methods may also utilize any type of acoustic source, such as beamformed audio signals generated by a beamformer.

The audio signals from each of the microphones 102 may be received by the mixer 106, such as at step 318 of the process 300 shown in FIG. 3, to generate a mixed audio signal, such as at step 326. The mixed audio signal generated by the mixer 106 may conform to a desired audio mix such that the audio signals from certain microphones are emphasized and the audio signals from other microphones are deemphasized or suppressed. Exemplary embodiments of audio mixers are disclosed in commonly-assigned patents, U.S. Pat. Nos. 4,658,425 and 5,297,210, each of which is incorporated by reference in its entirety. The mixed audio signal generated at step 326 may be converted into the frequency domain using a fast Fourier transform module 116, such as at step 328.

In parallel, the audio signals from each of the microphones 102 may be converted to the frequency domain by fast Fourier transform modules 114, such as at step 320. One of these converted audio signals may be selected and conveyed at step 322 by a signal selection mechanism, such as a switch 108, for example. The signal selection mechanism may gather information about each acoustic source (or subset of acoustic sources), e.g., audio signals from the microphones 102 or beamformed audio signals, in order to optimize the adaptation for a mix of all of the acoustic sources. While a switch 108 is illustrated in FIG. 1, other signal selection mechanisms are contemplated, such as a second mixer that could select the audio signal from a particular microphone 102 by attenuating some or all of the audio signals from the other microphones 102.

Each of the audio signals from the microphones 102 can be selected by the switch 108 and processed in turn, such that a background filter 202 and a hidden filter 204 (in the acoustic echo canceller 112) work on one of the audio signals at a time. The switch 108 may enable adaptation on each of the audio signals from the microphones 102 within a particular duration so that the communication system 100 may properly perform echo cancellation regardless of the type of mixer 106, the current state of the mixer 106, or if the mixer 106 is undergoing a change in state. At step 324, the background filter 202 and the hidden filter 204 in the acoustic echo canceller 112 may run on the selected audio signal. Step 324 is described below in more detail with respect to FIG. 4.

FIG. 4 describes further details of an embodiment of step 324 for running a background filter 202 and a hidden filter 204 in the acoustic echo canceller 112. The background filter 202 may be a finite impulse response filter that runs a normalized least-mean squares algorithm on the selected audio signal, such as at step 402, and may generate an estimate $\hat{h}_m[n]$ of the impulse response of a sample n for a microphone m in the environment. The background filter 202 may also measure a background error power of the selected audio signal, such as at step 404. The background filter 202 may have tap coefficients h that are used to scale a finite series of delay taps. A background error e[n] of the selected audio signal may be measured by the background filter 202 according to the equation:

$$e[n]=d[n]-\hat{h}^\dagger[n]x[n]$$

where d[n] is the audio signal, x[n] is a vector of samples from a remote audio signal, and † denotes a conjugate transpose operation. The background error power may be measured based on the background error e [n], such as by using a time average of the magnitude of the squared background error.

The hidden filter 204 may be a finite impulse response filter that is run at step 406, on a remote audio signal and a previous unweighted estimate of the echo-path impulse response made by the background filter 202. The unweighted previous estimate corresponds to an unweighted portion of the selected audio signal within a mix filter 208 (described below). The hidden filter 204 may measure a hidden error of the selected audio signal, such as at step 408, by subtracting the remote audio signal from the selected audio signal. A hidden error power may be measured based on the hidden error, such as by using a time average of the magnitude of the squared hidden error. The hidden filter 204 may have tap coefficients h that are used to scale a finite series of delay taps.

The background error power measured at step 404 and the hidden error power measured at step 408 may be compared at step 410 by an error comparison module 206. The error comparison module 206 may determine at step 410 whether the background error power is greater than the hidden error power. If it is determined that the background error power is greater than the hidden error power at step 410, then the process 324 may continue to step 412. At step 412, the tap coefficients of the background filter 202 may be selected and stored in a memory 110. At step 414, the stored tap coefficients from step 412 may be copied from the memory 110 and used to replace the tap coefficients of the hidden filter 204. The stored tap coefficients from step 412 may also be copied at step 414 from the memory 110 and used to update the tap coefficients of the mix filter 208, as described in more detail below.

Following step 414, the process 324 may continue to step 416. In addition, if it is determined at step 410 that the background error power is not greater than the hidden error power, then the process 324 may continue to step 416. At step 416, it may be determined whether a channel scaling factor α of the mixer 106 has changed. The channel scaling factor of the mixer 106 may change automatically or manually (e.g., by a user adjustment). If the channel scaling factor of the mixer 106 has changed at step 416, then the process 324 may continue to step 418. At step 418, the tap weights of the mix filter 208 may be updated corresponding to the changed channel scaling factor, such as by adding a difference in weight multiplied by a channel impulse response estimate, as described in more detail below.

Following step 418, the process 324 may continue to step 420. In addition, if it is determined that the channel scaling of the mixer 106 has not changed at step 416, then the process 324 may continue to step 420. At step 420, the tap coefficients of the background filter 202 may be updated, according to the equation:

$$\hat{h}[n+1] = \hat{h}[n] + \frac{\alpha}{\|x[n]\|^2} e^*[n]x[n]$$

where α is a step-size parameter, * denotes a complex conjugation operation, and $\|\cdot\|$ denotes a $l^2$ norm. The process 324 may then return to the process 300 and in particular, to step 308, as described below.

Returning to the process 300 of FIG. 3, while the audio signals are received from the microphones 102 and processed in steps 318-328 of the process 300 and steps 402-420 of the process 324, a remote audio signal may be received from a remote location, i.e., a far end, such as step 302. The remote audio signal may be output on the loudspeaker 104 in the environment, such as at step 304. At step 306, the remote audio signal may also be converted into the frequency domain using a fast Fourier transform module 118. At this point, it can be seen that the acoustic echo canceller 112 may receive the mixed audio signal from the mixer 106, the selected audio signal from the switch 108, and the remote audio signal from the remote location (far end). Each of the mixed audio signal from the mixer 106, the selected audio signal from the switch 108, and the remote audio signal may have been converted into the frequency domain, as previously described, by the respective FFT modules 114, 116, 118. Accordingly, the acoustic echo canceller 112 may operate in the frequency domain so that the acoustic echo cancellation is performed faster and with high quality.

The acoustic echo canceller 112 may run a mix filter 208 at step 308. The mix filter 208 may be a weighted sum $\hat{h}_{mix}[n]$ of the finite impulse responses of all the audio signals of the microphones 102, such that:

$$\hat{h}_{mix}[n] = \sum_{m=0}^{M-1} a_m \hat{h}_m[n]$$

□ here $\alpha_m$ is the channel scaling (weight or gain) of a particular microphone 102. The mix filter 208 processes the remote audio signal received from the far end and generates a filtered remote audio signal that is an estimate of the echo signal generated at the output of the mixer. In particular, the mix filter models the coupling between the echo paths detected by the microphones 102 and the mixer 106.

As described previously, the tap coefficients of the mix filter 208 may be updated by the tap coefficients of the background filter at step 414 of the process 324, if the background error power is greater than the hidden error power at step 410. When this occurs, the weighted sum $\hat{h}_{mix}[n+1]$ for the next sample n+1 may be given by:

$$\hat{h}_{mix}[n+1] = \sum_{m \neq m'}^{M-1} a_m \hat{h}_m[n] + a_{m'} \hat{h}_{m'}[n+1]$$

where m' is the selected audio signal of a particular microphone 102.

As also described previously, the tap weights of the mix filter 208 may be updated at step 418 of the process 324, if the channel scaling factor of the mixer 106 has changed at step 416. When this occurs, the update may be performed by adding the difference in weight multiplied by the channel impulse response estimate $\hat{h}_{m'}$. In particular, the weighted sum $\hat{h}_{mix}[n+1]$ for the next sample n+1 may be given by:

$$\hat{h}_{mix}[n+1] = \sum_{m \neq m'}^{M-1} a_m \hat{h}_m[n] + (a_{m'}[n+1] - a_{m'}[n])\hat{h}_{m'}[n]$$

After the mix filter 208 generates the filtered remote audio signal at step 308, the process 300 may continue to step 310. At step 310, the echo-cancelled mixed audio signal may be generated by the acoustic echo canceller 112. In particular, the filtered remote audio signal generated by the mix filter 208 may be subtracted from the mixed audio signal from the mixer 106, as denoted by the summing point 214 shown in FIG. 2. The echo-cancelled mixed audio signal may be processed by a non-linear processor at step 312, depending on the coherence of the filtered remote audio signal from the mix filter 208 and the estimated residual echo power of the echo-cancelled mixed audio signal output from the summing point 214. Details of step 312 are described below with respect to FIG. 5.

FIG. 5 describes further details of an embodiment of step 312 for running a non-linear processor 212 in the acoustic echo canceller 112 to generate an echo-suppressed mixed audio signal. In particular, after the echo-cancelled mixed audio signal is generated at step 310, it can be determined whether to run the non-linear processor 212 to further suppress any echo and generate comfort noise (e.g., synthetic background noise), as necessary. The non-linear processor 212 may run, for example, in situations when there is only speech and sound from the remote location (far end) and when the background filter 202 and the hidden filter 204 have not yet converged.

At step 502, the output coherence of the filtered remote audio signal from the mix filter 208 may be measured by mix estimators 210. The output coherence is a measure of the relationship between the frequency content of the filtered remote audio signal and the audio signals from the microphones 102. The mix estimators 210 may measure the coherence from the output of the mixer 106 prior to echo cancellation at the summing point 214 and after echo cancellation at the summing point 214. If the coherence is high, then the signals may be deemed to be related in the frequency domain. The residual echo power of the echo-cancelled mixed audio signal output from the summing point 214 may be estimated at step 504 by the mix estimators 210. The non-linear processor 212 may process the echo-cancelled mixed audio signal at step 508 to generate an echo-suppressed mixed audio signal if (1) the output coherence is greater than a predetermined threshold (e.g., signifying that there is only an echo signal present in the microphones 102); or (2) the residual echo power is greater than half of the power of the mixed audio signal from the mixer 106. Following step 508, the process 312 may continue to step 314 of the process 300. However, if neither of these conditions is satisfied, then the process 312 may continue from step 506 to step 314 of the process 300.

Returning to FIG. 3, at step 314, the (1) echo-cancelled mixed audio signal generated at step 310 (if the non-linear processor 212 was not executed at step 312) or (2) the echo-suppressed mixed audio signal generated at step 508 (if the non-linear processor 212 was executed at step 312) may be converted to the time domain. The resulting echo-cancelled or echo-suppressed audio signal may be transmitted to the remote location (far end) at step 316. The process 300 may return to step 322 to select and convey another of the audio signals from the microphones 102 for processing at steps 324 and 308-316, as described previously. In this way, information from the audio signal from each of the plurality of microphones 102 may be utilized when generating the echo-cancelled or echo-suppressed audio signal.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A system, comprising:
   (A) a memory;
   (B) a plurality of acoustic sources each configured to generate an audio signal;
   (C) a mixer in communication with the plurality of acoustic sources and the memory, the mixer configured to mix the audio signal from each of the plurality of acoustic sources to produce a mixed audio signal; and (D) an acoustic echo canceller in communication with the mixer, the memory, and a remote audio signal, the acoustic echo canceller configured to generate an echo-cancelled mixed audio signal based on the mixed audio signal, information gathered from the audio signal from each of the plurality of acoustic sources, and the remote audio signal;

wherein the acoustic echo canceller comprises:
a background filter configured to measure a background error power of the audio signal from each of the plurality of acoustic sources;
a hidden filter configured to measure a hidden error power of the audio signal from each of the plurality of acoustic sources; and
an error comparison module in communication with the background filter and the hidden filter, the error comparison module configured to compare the background error power and the hidden error power.

2. The system of claim 1:
further comprising a signal selection mechanism in communication with the plurality of acoustic sources and the acoustic echo canceller, the signal selection mechanism configured to select at least one audio signal from at least one of the plurality of acoustic sources and convey the at least one selected audio signal to the acoustic echo canceller;
wherein the acoustic echo canceller is further configured to generate the echo-cancelled mixed audio signal based on the mixed audio signal, information gathered from the at least one selected audio signal, and the remote audio signal.

3. The system of claim 1, wherein:
the background filter has background filter tap coefficients and is configured to measure the background error power of the audio signal from each of the plurality of acoustic sources using a normalized least-mean squares algorithm;
the hidden filter has hidden filter tap coefficients and is configured to measure the hidden error power of the audio signal from each of the plurality of acoustic sources, based on the audio signal from each of the plurality of acoustic sources and the remote audio signal; and
the error comparison module is further configured to select and store the background filter tap coefficients in the memory, if a condition is satisfied based on the comparison of the background error power to the hidden error power.

4. The system of claim 3, wherein the error comparison module is further configured to copy the stored background filter tap coefficients from the memory to replace the hidden filter tap coefficients, if the condition is satisfied based on the comparison of the background error power to the hidden error power.

5. The system of claim 3, wherein the background filter is configured to measure a background error e[n] according to the equation:

$$e[n]=d[n]-\hat{h}^\dagger[n]x[n]$$

where d[n] is one of the audio signals, x[n] is a vector of samples from the remote audio signal, and $^\dagger$ denotes a conjugate transpose operation;
wherein the background error power is estimated based on the background error.

6. The system of claim 3, wherein the error comparison module is further configured to update the background filter tap coefficients according to the equation:

$$\hat{h}[n+1] = \hat{h}[n] + \frac{\alpha}{\|x[n]\|^2}e^*[n]x[n]$$

where α is a step-size parameter, * denotes a complex conjugation operation, and ∥·∥ denotes a $l^2$ norm.

7. The system of claim 1, wherein the acoustic echo canceller further comprises:
a mix filter having mix filter tap coefficients and tap weights, and configured to filter the remote audio signal to generate a filtered remote audio signal.

8. The system of claim 3, wherein:
the acoustic echo canceller further comprises a mix filter having mix filter tap coefficients and tap weights, and configured to filter the remote audio signal to generate a filtered remote audio signal; and
the error comparison module is further configured to copy the stored background filter tap coefficients from the memory to update the mix filter tap coefficients by combining the hidden filter tap coefficients of each of the plurality of acoustic sources not currently under adaptation and the most recently updated background filter tap coefficients corresponding to the acoustic source currently under adaptation, if the condition is satisfied based on the comparison of the background error power to the hidden error power.

9. The system of claim 3, wherein:
the acoustic echo canceller further comprises a mix filter having mix filter tap coefficients and tap weights, and configured to filter the remote audio signal to generate a filtered remote audio signal; and
the mix filter is further configured to be updated if a channel scaling factor of the mixer has changed by updating the tap weights corresponding to the changed channel scaling factor by adding the difference in weight multiplied by a channel impulse response estimate.

10. The system of claim 7, wherein the acoustic echo canceller is configured to generate the echo-cancelled mixed audio signal by subtracting the filtered remote audio signal from the mixed audio signal.

11. The system of claim 10, wherein the acoustic echo canceller further comprises:
a mix estimator in communication with the mixer, the mix filter, and the echo-cancelled mixed audio signal, the mix estimator configured to:
measure an output coherence of the filtered remote audio signal; and
estimate a residual echo power of the echo-cancelled mixed audio signal; and
a non-linear processor configured to process the echo-cancelled mixed audio signal to generate an echo-suppressed mixed audio signal, if the output coherence exceeds a predetermined threshold or if the residual echo power exceeds half of a power of the mixed audio signal.

12. A method, comprising:
receiving an audio signal from each of a plurality of acoustic sources;
receiving a remote audio signal;

mixing the audio signal from each of the plurality of acoustic sources using a mixer to produce a mixed audio signal; and generating an echo-cancelled mixed audio signal based on the mixed audio signal, information gathered from the audio signal from each of the plurality of acoustic sources, and the remote audio signal, using an acoustic echo canceller, wherein generating the echo-cancelled mixed audio signal comprises:

measuring a background error power of the audio signal from each of the plurality of acoustic sources in a background filter;

measuring a hidden error power of the audio signal from each of the plurality of acoustic sources, using a hidden filter; and comparing the background error power and the hidden error power.

13. The method of claim 12:

further comprising selecting and conveying at least one selected audio signal from at least one of the plurality of acoustic sources using a signal selection mechanism to the acoustic echo canceller;

wherein generating the echo-cancelled mixed audio signal comprises generating the echo-cancelled mixed audio signal based on the mixed audio signal, information gathered from the at least one selected audio signal, and the remote audio signal.

14. The method of claim 12, wherein:

measuring the background error power comprises measuring the background error power of the audio signal from each of the plurality of acoustic sources using a normalized least-mean squares algorithm in the background filter having background filter tap coefficients;

measuring the hidden error power comprises measuring the hidden error power based on the audio signal from each of the plurality of acoustic sources and the remote audio signal, using the hidden filter having hidden filter tap coefficients; and selecting and storing the background filter tap coefficients in a memory, if a condition is satisfied based on the comparison of the background error power to the hidden error power.

15. The method of claim 14, further comprising copying the stored background filter tap coefficients from the memory to replace the hidden filter tap coefficients, if the condition is satisfied based on the comparison of the background error power to the hidden error power.

16. The method of claim 14, wherein:

measuring the background error power comprises measuring a background error e[n] according to the equation:

$$e[n] = d[n] - \hat{h}^\dagger[n]x[n]$$

where d[n] is one of the audio signals, x[n] is a vector of samples from the remote audio signal, and $^\dagger$ denotes a conjugate transpose operation; and estimating the background error power based on the background error.

17. The method of claim 14, further comprising updating the background filter tap coefficients according to the equation:

$$\hat{h}[n+1] = \hat{h}[n] + \frac{\alpha}{\|x[n]\|^2} e^*[n]x[n]$$

where $\alpha$ is a step-size parameter, * denotes a complex conjugation operation, and $\|\cdot\|$ denotes a $l^2$ norm.

18. The method of claim 12, further comprising filtering the remote audio signal to generate a filtered remote audio signal using a mix filter having mix filter tap coefficients and tap weights.

19. The method of claim 14, further comprising:

filtering the remote audio signal to generate a filtered remote audio signal using a mix filter having mix filter tap coefficients and tap weights; and copying the stored background filter tap coefficients from the memory to update the mix filter tap coefficients by combining the hidden filter tap coefficients of each of the plurality of acoustic sources not currently under adaptation and the most recently updated background filter tap coefficients corresponding to the acoustic source currently under adaptation, if the condition is satisfied based on the comparison of the background error power to the hidden error power.

20. The method of claim 14, further comprising:

filtering the remote audio signal to generate a filtered remote audio signal using a mix filter having mix filter tap coefficients and tap weights; and if a channel scaling factor of the mixer has changed, updating the mix filter by updating the tap weights corresponding to the changed channel scaling factor by adding the difference in weight multiplied by a channel impulse response estimate.

21. The method of claim 18, wherein generating the echo-cancelled mixed audio signal comprises subtracting the filtered remote audio signal from the mixed audio signal.

22. The method of claim 21, further comprising:

measuring an output coherence of the filtered remote audio signal using a mix estimator;

estimating a residual echo power of the echo-cancelled mixed audio signal, using the mix estimator; and processing the echo-cancelled mixed audio signal to generate an echo-suppressed mixed audio signal using a non-linear processor, if the output coherence exceeds a predetermined threshold or if the residual echo power exceeds half of a power of the mixed audio signal.

* * * * *

UNITED STATES PATENT AND TRADEMARK OFFICE
CERTIFICATE OF CORRECTION

PATENT NO. : 11,477,327 B2
APPLICATION NO. : 16/523070
DATED : October 18, 2022
INVENTOR(S) : Sean Wells-Rutherford et al.

It is certified that error appears in the above-identified patent and that said Letters Patent is hereby corrected as shown below:

In the Specification

Column 5, Line 39, "and † denotes" should be changed to --and $\square^\dagger$ denotes--.

Column 6, Line 33, "parameter, * denotes" should be changed to --parameter, $\square^*$ denotes--.

Column 7, Line 1, "□ here α$_m$" should be changed to --where $a_m$--.

In the Claims

Claim 5, Column 9, Line 64, "and † denotes" should be changed to --and $\square^\dagger$ denotes--.

Claim 6, Column 10, Line 10, "parameter, * denotes" should be changed to --parameter, $\square^*$ denotes--.

Claim 16, Column 11, Line 56, "and † denotes" should be changed to --and $\square^\dagger$ denotes--.

Claim 17, Column 12, Line 12, "parameter, * denotes" should be changed to --parameter, $\square^*$ denotes--.

Signed and Sealed this
Twenty-eighth Day of March, 2023

*Katherine Kelly Vidal*

Katherine Kelly Vidal
*Director of the United States Patent and Trademark Office*